(12) United States Patent
Coffman et al.

(10) Patent No.: US 10,609,435 B1
(45) Date of Patent: Mar. 31, 2020

(54) SYSTEM AND METHOD FOR ADVERTISING INVENTORY MANAGEMENT FOR TELEVISION PROVIDER

(71) Applicant: INNOVAR MEDIA LLC, Irving, TX (US)

(72) Inventors: Webster Shawn Coffman, Norman, OK (US); Steve Laughlin, McKinney, TX (US)

(73) Assignee: INNOVAR MEDIA LLC, Irving, TX (US)

( * ) Notice: Subject to any disclaimer, the term of this patent is extended or adjusted under 35 U.S.C. 154(b) by 0 days.

(21) Appl. No.: 16/201,674

(22) Filed: Nov. 27, 2018

(51) Int. Cl.
*H04N 7/10* (2006.01)
*H04N 7/025* (2006.01)
(Continued)

(52) U.S. Cl.
CPC ... *H04N 21/25435* (2013.01); *G06Q 30/0242* (2013.01); *G06Q 30/0273* (2013.01);
(Continued)

(58) Field of Classification Search
CPC .............. G06Q 30/02; G06Q 30/0241; G06Q 30/0277; G06Q 30/0244; G06Q 30/0251;
(Continued)

(56) References Cited

U.S. PATENT DOCUMENTS

| | | | |
|---|---|---|---|
| 8,265,996 B2 * | 9/2012 | Steelberg | G06Q 30/0264 705/14.64 |
| 2007/0271145 A1 * | 11/2007 | Vest | G06Q 30/02 705/14.41 |

(Continued)

*Primary Examiner* — Jason Salce

(57) ABSTRACT

A system for managing cable network advertising inventory includes a network interface for connecting to a plurality of remote data sources. A processor coupled to the network interface for implementing an inventory management system responsive to a stored set of instructions. A memory coupled to the processor. The memory storing data and a set of instructions for implementing the inventory management system. The data including the advertising inventory data. The set of instructions configuring the processor to receive from the plurality of remote data sources the advertising inventory data, establish first metric values for a plurality of performance metrics relating to a plurality of performance parameters using a graphical user interface generated by the inventory management system, combine the advertising inventory data from the plurality of remote data sources data sources to generate a combined database of the plurality of performance parameters, generate a plurality of level of detail views of the combined database of the plurality of performance parameters responsive to the established first metric values for the plurality of performance metrics, the plurality of level of detail view ranging from an enterprise level view down to a selected lowest level of detail, display a first level of detail of the combined data of the plurality of performance parameters on a graphical user interface generated by the inventory management system, the first level of detail responsive to a first established group of the first metric values for the plurality of performance metrics and display a second level of detail of the combined data of the plurality of performance parameters on the graphical user interface generated by the inventory management system, the second level of detail responsive to a second established group of the first metric values for the plurality of performance metrics.

28 Claims, 35 Drawing Sheets

(51) Int. Cl.
  *H04N 21/2543* (2011.01)
  *G06Q 30/02* (2012.01)
  *H04N 21/25* (2011.01)
  *H04N 21/2665* (2011.01)
  *H04N 21/24* (2011.01)
  *H04N 21/258* (2011.01)
  *H04N 21/81* (2011.01)

(52) U.S. Cl.
  CPC ....... *H04N 21/2407* (2013.01); *H04N 21/251* (2013.01); *H04N 21/25808* (2013.01); *H04N 21/2665* (2013.01); *H04N 21/812* (2013.01)

(58) Field of Classification Search
  CPC ........... G06Q 30/0269; G06Q 30/0202; G06Q 30/0254; G06Q 10/087; G06Q 30/0247; G06Q 10/04; G06Q 30/0201; G06Q 30/0243; G06Q 30/0242; G06Q 30/0206; H04N 21/812; H04N 21/2668; H04N 21/2547; H04N 21/2543
  See application file for complete search history.

(56) References Cited

U.S. PATENT DOCUMENTS

| | | | | |
|---|---|---|---|---|
| 2008/0004947 A1* | 1/2008 | Mathew | ................. | G06Q 30/02 705/14.52 |
| 2008/0022301 A1* | 1/2008 | Aloizos | ................. | G06Q 30/02 725/34 |
| 2008/0065508 A1* | 3/2008 | Watt | ...................... | G06Q 30/02 705/26.1 |
| 2008/0097842 A1* | 4/2008 | Tirumala | ............... | G06Q 30/02 705/14.43 |
| 2009/0076890 A1* | 3/2009 | Dixon | .................... | G06Q 30/02 705/14.41 |
| 2009/0204479 A1* | 8/2009 | Wolinsky | ............... | G06Q 30/02 705/14.57 |
| 2009/0216621 A1* | 8/2009 | Anderson | .............. | G06Q 30/02 705/14.7 |
| 2009/0254420 A1* | 10/2009 | Curd | ...................... | G06Q 30/02 705/7.29 |
| 2009/0276317 A1* | 11/2009 | Dixon | .................. | G06Q 10/087 705/14.61 |
| 2010/0146542 A1* | 6/2010 | Weihs | ................. | H04N 7/17318 725/34 |
| 2012/0023522 A1* | 1/2012 | Anderson | .............. | G06Q 30/02 725/35 |
| 2013/0066705 A1* | 3/2013 | Umeda | ............. | G06Q 30/0241 705/14.41 |
| 2013/0066715 A1* | 3/2013 | Umeda | .................. | G06Q 30/02 705/14.46 |
| 2013/0080264 A1* | 3/2013 | Umeda | .................. | G06Q 30/02 705/14.69 |
| 2013/0103491 A1* | 4/2013 | Silverstein | ............. | G06Q 30/02 705/14.45 |
| 2013/0205339 A1* | 8/2013 | Haberman | ........... | H04N 21/812 725/35 |
| 2014/0337125 A1* | 11/2014 | Dalto | ................ | G06Q 30/0249 705/14.48 |
| 2015/0363820 A1* | 12/2015 | Leitersdorf | ............ | G06Q 10/04 705/14.41 |
| 2016/0037197 A1* | 2/2016 | Kitts | ................ | H04N 21/25883 725/35 |

\* cited by examiner

TO FIG. 6E

| $ Revenue $616,511,169.70 (Ver) $688,757,958.70 (Sold) | | |
|---|---|---|
| Market ⇔ | Ver ▼ | Sold ⇔ |
| New York City | $108,343,467.60 | $119,503,863.89 |
| Dallas | $91,943,302.67 | $104,933,198.90 |
| Cleveland | $48,578,921.85 | $53,913,562.23 |
| Charlotte | $39,621,271.92 | $44,069,929.80 |
| Raleigh | $31,829,176.30 | $35,013,954.56 |
| San Antonio | $29,481,928.74 | $33,311,727.26 |
| Columbus-Oh | $26,840,019.77 | $30,256,502.07 |
| Austin | $24,500,495.88 | $27,811,000.69 |
| Cincinnati | $23,518,170.02 | $27,035,117.09 |
| Central New York | $21,311,574.36 | $24,081,990.45 |
| Buffalo | $18,062,040.71 | $19,907,990.85 |
| Kansas City | $17,197,111.65 | $18,955,876.85 |
| Louisville | $14,080,280.94 | $15,501,643.41 |
| Summary (32) | $616,511,169.70 | $688,757,958.70 |

| ☑ Sellout 19.6% | | | |
|---|---|---|---|
| Market ⇔ | Sellout % ▼ | Sold ⇔ | Open ⇔ | Avails ⇔ |
| El Paso | 36.8% | 945,400.0 | 1,620,515.0 | 2,565,915.0 |
| Laredo | 34.6% | 448,592.0 | 846,057.0 | 1,294,649.0 |
| Cleveland | 33.9% | 4,278,691.5 | 8,352,025.2 | 12,630,716.7 |
| Lima | 31.7% | 444,273.0 | 955,373.2 | 1,399,646.2 |
| Corpus Christi | 31.6% | 808,794.0 | 1,753,766.0 | 2,562,560.0 |
| Myrtle Beach | 28.6% | 1,112,662.0 | 2,774,289.0 | 3,886,951.0 |
| Youngstown | 28.3% | 623,908.5 | 1,577,440.2 | 2,201,348.7 |
| Rio Grande Valley | 26.6% | 439,804.0 | 1,216,477.0 | 1,656,281.0 |
| Austin | 25.6% | 1,893,201.0 | 5,492,523.0 | 7,385,724.0 |
| New York City | 25.4% | 3,789,694.3 | 11,107,357.0 | 14,897,051.3 |
| Central New York | 25.2% | 3,148,928.7 | 9,352,868.3 | 12,501,797.0 |
| Rochester | 23.8% | 855,118.5 | 2,730,648.5 | 3,585,767.0 |
| Waco | 23.4% | 473,768.0 | 1,547,504.0 | 2,021,272.0 |
| Summary (32) | 19.6% | 38,030,482.8 | 155,757,465.4 | 193,787,948.2 |

| ⊞ Average Unit Rate (AUR) $18.11 | | | | | ⬆ ⊙ ○ ✎ |
|---|---|---|---|---|---|
| Market ⇔ | AUR ▼ | eAUR ⇔ | Revenue(Sold) ⇔ | Sold ⇔ | Avails ⇔ |
| Raleigh | $38.54 | $3.45 | $35,013,954.56 | 908,614.8 | 10,139,364.0 |
| Cincinnati | $36.99 | $5.17 | $27,035,117.09 | 730,821.5 | 5,224,689.7 |
| Columbus-Oh | $34.75 | $4.39 | $30,256,502.07 | 870,793.5 | 6,897,874.2 |
| Kansas City | $33.26 | $2.54 | $18,955,876.85 | 569,929.5 | 7,458,099.0 |
| New York City | $31.53 | $8.02 | $119,503,863.89 | 3,789,694.3 | 14,897,051.3 |
| Charlotte | $31.13 | $3.52 | $44,069,929.80 | 1,415,647.7 | 12,513,531.0 |
| San Antonio | $30.13 | $5.33 | $33,311,727.26 | 1,105,455.2 | 6,255,706.0 |
| Dallas | $25.81 | $5.43 | $104,933,198.90 | 4,065,528.0 | 19,325,533.0 |
| Dayton | $23.49 | $2.54 | $10,164,414.98 | 432,681.5 | 3,996,882.7 |
| Louisville | $22.64 | $2.98 | $15,501,643.41 | 684,753.0 | 5,198,764.0 |
| Rio Grande Valley | $18.16 | $4.82 | $7,984,893.42 | 439,804.0 | 1,656,281.0 |
| Lexington | $17.80 | $3.09 | $9,890,306.13 | 555,523.0 | 3,202,811.0 |
| Rochester | $16.73 | $3.99 | $14,306,345.58 | 855,118.5 | 3,585,767.0 |
| Summary (32) | $18.11 | $3.55 | $688,757,958.70 | 38,030,482.8 | 193,787,948.2 |

| ⊞ Avails 193,787,948.2 | | | | ⬆ ⊙ ○ ✎ |
|---|---|---|---|---|
| Market ⇔ | Avails ▼ | Ver ⇔ | Sold ⇔ | Open ⇔ |
| Dallas | 19,325,533.0 | 3,593,302.0 | 4,065,528.0 | 15,260,005.0 |
| New York City | 14,897,051.3 | 3,106,913.8 | 3,789,694.3 | 11,107,357.0 |
| Cleveland | 12,630,716.7 | 3,845,771.5 | 4,278,691.5 | 8,352,025.2 |
| Charlotte | 12,513,531.0 | 1,271,135.3 | 1,415,647.7 | 11,097,883.3 |
| Central New York | 12,501,797.0 | 2,739,270.8 | 3,148,928.7 | 9,352,868.3 |
| Raleigh | 10,139,364.0 | 822,626.2 | 908,614.8 | 9,230,749.2 |
| Buffalo | 8,141,181.7 | 1,214,403.2 | 1,335,188.3 | 6,805,993.3 |
| Kansas City | 7,458,099.0 | 515,828.0 | 569,929.5 | 6,888,169.5 |
| Austin | 7,385,724.0 | 1,633,673.8 | 1,893,201.0 | 5,492,523.0 |
| Portland | 7,363,848.0 | 699,851.5 | 765,231.5 | 6,598,616.5 |
| Columbus-Oh | 6,897,874.2 | 768,728.5 | 870,793.5 | 6,027,080.7 |
| Albany | 6,724,441.7 | 960,559.5 | 1,059,488.5 | 5,664,953.2 |
| San Antonio | 6,255,706.0 | 973,623.8 | 1,105,488.5 | 5,150,250.8 |
| Summary (32) | 193,787,948.2 | 33,708,809.0 | 38,030,482.8 | 155,757,465.4 |

FROM FIG. 6D

| | Weighted | | IC / Zone / All | | | Revenue Option | | $ Zero Dollar | | |
|---|---|---|---|---|---|---|---|---|---|---|
| | Yes | No | IC Only | Zone Only | All | Verified | Sold | On | Off | Only |
| | 1328 | 1330 | 1332 | 1334 | 1336 | 1338 | 1340 | 1342 | 1344 | 1346 |

| Inventory Type 1376 | Daypart 1378 | Day 1380 | Clear All |
|---|---|---|---|
| | | | |

| | 1398 Late Night 12M-2A | | | | Overnight 2A-5A 1399 | | | |
|---|---|---|---|---|---|---|---|---|
| Open -67,251.5 | Avails 90,664 | Ver. 0 | Sold 46,021 | Open 44,643 | Avails 199,400 | Ver. 0 | Sold 36,706 | Open 162,694 |
| | Worth - | ARR - | Rev (Sold) $90,833.20 | | Worth - | ARR - | Rev (Sold) $6,441.41 | |
| eAUR $13.46 | CPP - | BMR - | RC - | eAUR $1.00 | CPP - | BMR - | RC - | eAUR $0.03 |
| Open -20,325.5 | Avails 117,914 | Ver. 0 | Sold 50,676 | Open 67,238 | Avails 247,674 | Ver. 0 | Sold 51,432 | Open 196,242 |
| | Worth - | ARR - | Rev (Sold) $101,503.35 | | Worth - | ARR - | Rev (Sold) $14,515.07 | |
| eAUR $9.73 | CPP - | BMR - | RC - | eAUR $0.86 | CPP - | BMR - | RC - | eAUR $0.06 |
| Open 61,131.5 | Avails 93,879 | Ver. 0 | Sold 25,607 | Open 68,272 | Avails 180,547 | Ver. 0 | Sold 17,582 | Open 162,965 |
| | Worth - | ARR - | Rev (Sold) $49,511.67 | | Worth - | ARR - | Rev (Sold) $3,987.88 | |
| eAUR $6.95 | CPP - | BMR - | RC - | eAUR $0.53 | CPP - | BMR - | RC - | eAUR $0.02 |
| | 100%+ 1309 | | | | Unavailable 1311 | | | |

FROM FIG. 13B

FIG. 13C

View By

| Previous period | Client | Division | Region | Market | Territory |
| --- | --- | --- | --- | --- | --- |
| 1514 | 1516 | 1518 | 1520 | 1522 | 1524 |

Market 1564 | Territory 1566 | Zone 1568

|  |  | #Dayparts 1582 |  |  |  | Revenue (Sold) 1584 |  |
| --- | --- | --- | --- | --- | --- | --- | --- |
| Chg | Chg% | Q1 2018 | Q1 2017 | Chg | Chg% | Q1 2018 | Q1 2017 |
| 3 | 100.0% | 3 | 0 | 3 | 100.0% | $814,371.26 | $0.00 |
| 8 | 100.0% | 3 | 0 | 3 | 100.0% | $792,327.64 | $0.00 |
| -5 | -11.1% | 4 | 5 | -1 | -25.0% | $792,161.40 | $1,318,402.09 |
| 0 | 0.0% | 3 | 3 | 0 | 0.0% | $749,187.12 | $922,356.65 |
| 4 | 14.8% | 3 | 5 | -2 | -66.7% | $694,922.81 | $553,646.53 |
| -4 | -9.3% | 5 | 5 | 0 | 0.0% | $688,030.94 | $1,243,812.96 |
| 8 | 100.0% | 4 | 0 | 4 | 100.0% | $643,632.01 | $0.00 |
| 5 | 15.6% | 4 | 4 | 0 | 0.0% | $596,039.81 | $1,472,284.00 |
| 9 | 42.9% | 4 | 4 | 0 | 0.0% | $593,193.33 | $295,488.17 |
| 29 | 100.0% | 4 | 0 | 4 | 100.0% | $589,402.00 | $0.00 |
| 18 | 100.0% | 3 | 0 | 3 | 100.0% | $579,591.00 | $0.00 |
| 13 | 100.0% | 3 | 0 | 3 | 100.0% | $571,789.00 | $0.00 |
| -4 | -13.3% | 3 | 3 | 0 | 0.0% | $564,112.49 | $627,720.59 |
| -3 | -7.7% | 4 | 4 | 0 | 0.0% | $515,884.93 | $435,806.53 |
| 6 | 37.5% | 4 | 3 | 1 | 25.0% | $514,116.91 | $368,149.00 |

| | | Spots (Sold) 1586 | | | | AUR 1588 | | |
|---|---|---|---|---|---|---|---|---|
| Chg | Chg% | Q1 2018 | Q1 2017 | Chg | Chg% | Q1 2018 | Q1 2017 | Chg |
| $814,371.26 | 100.0% | 2,094.0 | 0.0 | 2,094.0 | 100.0% | $388.91 | $0.00 | $388. |
| $792,327.64 | 100.0% | 4,545.0 | 0.0 | 4,545.0 | 100.0% | $174.33 | $0.00 | $174. |
| ($526,240.69) | -66.4% | 13,363.0 | 23,443.0 | -10,080.0 | -75.4% | $59.28 | $56.24 | $3. |
| ($173,169.53) | -23.1% | 2,818.0 | 3,614.0 | -796.0 | -28.2% | $265.86 | $255.22 | $10. |
| $141,276.28 | 20.3% | 12,936.0 | 9,112.0 | 3,824.0 | 29.6% | $53.72 | $60.76 | ($7. |
| ($555,782.02) | -80.8% | 17,761.0 | 22,260.0 | -4,499.0 | -25.3% | $38.74 | $55.88 | ($17. |
| $643,632.01 | 100.0% | 11,101.0 | 0.0 | 11,101.0 | 100.0% | $57.98 | $0.00 | $57. |
| ($876,244.19) | -147.0% | 3,277.0 | 5,217.0 | -1,940.0 | -59.2% | $181.89 | $282.21 | ($100. |
| $297,705.16 | 50.2% | 557.0 | 244.0 | 313.0 | 56.2% | $1,064.98 | $1,211.02 | ($146. |
| $589,402.00 | 100.0% | 541.0 | 0.0 | 541.0 | 100.0% | $1,089.47 | $0.00 | $1,089. |
| $579,591.00 | 100.0% | 2,200.0 | 0.0 | 2,200.0 | 100.0% | $263.45 | $0.00 | $263. |
| $571,789.00 | 100.0% | 7,302.0 | 0.0 | 7,302.0 | 100.0% | $78.31 | $0.00 | $78. |
| ($63,608.10) | -11.3% | 26,136.0 | 19,026.0 | 7,110.0 | 27.2% | $21.58 | $32.99 | ($11. |
| $80,078.40 | 15.5% | 3,813.0 | 2,678.0 | 1,135.0 | 29.8% | $135.30 | $162.74 | ($27. |
| $145,967.91 | 28.4% | 11,163.0 | 3,472.0 | 7,691.0 | 68.9% | $46.06 | $106.03 | ($59. | innVision DEMO — 1800

Custom Forecast Adjustments
Standard Forecast - Sellout %

Create Adjustment

General Criteria — 1802, 1808

Division: All Divisions
Zone: All Zones

Region — 1804
All Regions
Network
All Networks

Market — 1806
All Markets
Daypart
All Dayparts

Date Criteria

Monthly ▼    📅 December 26, 2016 - December 31, 2017 ▼ — 1816

— 1810
— 1812

Custom Adjustments — 1814

Show [10 ▼] entries — 1820, 1824, 1826

[+ Add Adjustment]

Search: _____ — 1850

| Actions | Division ◆ | Region ◆ | Market ◆ | Zone ◆ | Network ◆ | Daypart ◆ | Aug ◆ | Sep ◆ | Oct ◆ | Nov ◆ | Dec ◆ |
|---|---|---|---|---|---|---|---|---|---|---|---|
| ⊘ | Division 1 | Region 1 | Market 1 | All | All | All | 0% | 0% | -50% | 0% | 0% |
| ⊘ | Division 1 | Region 1 | Market 1 | Zone 1003 | AMC | Prime Time | -1% | 0% | 10% | 2% | 0% |
| ⊘ | Division 2 | Region 3 | Market 23 | Zone 1149 | CMDY | Prime Time | 0% | 0% | 0% | 0% | 0% |

1828, 1830, 1832, 1836, 1838, 1840, 1842, 1844, 1846, 1848, 1852

1822

Showing 1 to 3 of 3 entries — 1818

Previous [1] Next    [Close]

FIG. 18

TO FIG. 20B innVision DEMO

⊗ Performance Goals

▦ Performance Goal Sheet  "Market 1 Performance Goal Sheet 2017"

⊕ Add Zone 2004   2006   2008   2010   2012   2014   2018

| Zone | Network | Daypart | Timepart | Previous Performance | Current Goal | Jan | Feb | Mar |
|---|---|---|---|---|---|---|---|---|
| − Zone AAAA | ⊕ | | | $55,731,600 | $61,792,580 | $4,697,580 | $4,420,000 | $4,717,000 |
| | + AEN | + Prime Time | | $1,371,600 | $1,392,580 | $97,580 | $120,000 | $117,000 |
| | | | 8p - 9p | $548,640 | $568,080 | $39,880 | $48,000 | $46,800 |
| | | | All Other Timepart | $164,592 | $184,360 | $13,000 | $14,400 | $14,040 |
| | | All Other Daypart | | $384,048 | $383,720 | $26,880 | $33,600 | $32,760 |
| | All Other Network | ⊕ | | $822,960 | $824,500 | $57,700 | $72,000 | $70,200 |
| | | | | $54,360,000 | $60,400,000 | $4,600,000 | $4,300,000 | $4,600,000 |
| All Other Zones | ⊕ | | | $43,380,000 | $48,200,000 | $5,000,000 | $2,600,000 | $4,000,000 |
| Total | | | | $99,111,600 | $109,992,580 | $9,697,580 | $7,020,000 | $8,717,000 |

FIG. 20A

|     | Apr | May | Jun | Jul | Aug | Sep | Oct | Nov | Dec |
|---|---|---|---|---|---|---|---|---|---|
|  | $6,163,000 | $4,897,000 | $5,308,000 | $6,035,000 | $4,600,000 | $4,712,000 | $7,117,000 | $4,728,000 | $4,398,000 |
|  | $163,000 | $97,000 | $108,000 | $135,000 | $100,000 | $112,000 | $117,000 | $128,000 | $98,000 |
|  | $65,200 | $38,800 | $43,200 | $54,000 | $40,000 | $44,800 | $57,000 | $51,200 | $39,200 |
|  | $19,560 | $11,640 | $12,960 | $16,200 | $12,000 | $13,440 | $30,000 | $15,360 | $11,760 |
|  | $45,640 | $27,160 | $30,240 | $37,800 | $28,000 | $31,360 | $27,000 | $35,840 | $27,440 |
|  | $97,800 | $58,200 | $64,800 | $81,000 | $60,000 | $67,200 | $60,000 | $76,800 | $58,800 |
|  | $6,000,000 | $4,800,000 | $5,200,000 | $5,900,000 | $4,500,000 | $4,600,000 | $7,000,000 | $4,600,000 | $4,300,000 |
|  | $4,300,000 | $3,400,000 | $3,100,000 | $3,800,000 | $2,800,000 | $2,300,000 | $12,500,000 | $2,400,000 | $2,000,000 |
|  | $10,463,000 | $8,297,000 | $8,408,000 | $9,835,000 | $7,400,000 | $7,012,000 | $19,617,000 | $7,128,000 | $6,398,000 |

FIG. 20B

FROM FIG. 20A

2402 RATE CARD MANAGER
- 2404 — CREATE AND MANAGE RATE CARDS
- 2406 — FLEXIBLE APPROVAL WORK FLOW
- 2408 — PROVIDE SUGGESTED PRICE CRITICAL NOTIFICATIONS
- 2410 — AUTOMATED UPDATES BASE ON STRATA RCM
- 2412 — HISTORICAL PERFORMANCE AND FORECAST

2208 SDP → PRICING ANALYSIS 2324
- OPTIMAL RATE 2702
- REVENUE 2704
- AUR 2706
- RATE CARD 2710
- BMR 2712
- SELLOUT LEVELS 2718

FIG. 25B

| Active | Region | Market | Zone | Network | Daypart | RC Rate | RC Name | Suggested |
|---|---|---|---|---|---|---|---|---|
| ▲ ✓ | North | Market 1 | Zone 1 | AEN | PT | 22.00 | 2016 Market 1 | 24.00 |
| ▲ ✓ | North | Market 1 | Zone 1 | TNT | OV | 12.02 | 2016 Market 1 | 14.25 |
| ▲ ✓ | West | Market 1 | Zone 23 | TBS | PT | 54.25 | 2016 Market 1 | 60 |
| ▲ ✓ | North | Market 2 | Zone 3 | BET | PA | 25 | 2016 Market 2 | 32 |
| ▲ ✓ | North | Market 2 | Zone 3 | BET | DT | 17 | 2016 Market 2 | 23 |
| ▲ ✓ | North | Market 3 | Zone 7 | TNT | DT | 3 | 2016 Market 3 | 7 |

FIG. 28

SYSTEM AND METHOD FOR ADVERTISING INVENTORY MANAGEMENT FOR TELEVISION PROVIDER

TECHNICAL FIELD

The present invention relates to advertising inventory for cable television operators, and more particularly, to a system and method enabling cable television system providers to manage and price the advertising inventory for the cable television system.

BACKGROUND

Cable television network operators receive programming inputs from a variety of network providers such as major television networks, ESPN, A&E, TNT, FX and a variety of other cable networks. Each of these networks are broadcast to customer areas within the cable operators operating area. These areas may have various differences in the networks and channels broadcast to each based upon the location within the cable operators operating area. Each of the networks provide cable operators with a number of advertising slots within the programs or time periods based on their agreement. The cable operators sell these advertising slots at a local or national level to generate advertising revenue. These advertising slots are referred to as advertising inventory and existing information with respect to advertising inventory is provided from a number of outside data sources in a non-centralized fashion. Thus, there is a need for providing the cable operator a centralized management system that enables management of available advertising inventory to assist their salesforce in managing, selling and pricing the available advertising inventory.

SUMMARY

The present invention, as disclosed and described herein, comprises a system for managing and pricing cable network advertising inventory including a network interface for connecting to a plurality of remote data sources. A processor coupled to the network interface implements an inventory management system responsive to a stored set of instructions. A memory coupled to the processor stores data and a set of instructions for implementing the inventory management system. The data includes the advertising inventory data. The set of instructions configures the processor to receive from the plurality of remote data sources the advertising inventory data, establish first metric values for a plurality of performance metrics relating to a plurality of performance parameters using a graphical user interface generated by the inventory management system, combine the advertising inventory data from the plurality of remote data sources data sources to generate a combined database of the plurality of performance parameters, generate a plurality of level of detail views of the combined database of the plurality of performance parameters responsive to the established first metric values for the plurality of performance metrics, the plurality of level of detail views ranging from an enterprise level view down to a selected lowest level of detail, display a first level of detail of the combined data of the plurality of performance parameters on a graphical user interface generated by the inventory management system, the first level of detail responsive to a first established group of the first metric values for the plurality of performance metrics. The instructions further configuring the processor to display a second level of detail of the combined data of the plurality of performance parameters on the graphical user interface generated by the inventory management system. The second level of detail responsive to a second established group of the first metric values for the plurality of performance metrics.

BRIEF DESCRIPTION OF THE DRAWINGS

For a more complete understanding, reference is now made to the following description taken in conjunction with the accompanying Drawings in which:

FIG. 6D-6E illustrates a graphical user interface of the performance management functionalities relating to key performance indicators in a table form;

FIGS. 13A-13C illustrates an inventory map showing available inventory according to designated factors;

FIGS. 15A-15C illustrates a client inventory analysis overview screen;

FIG. 18 illustrates a graphical user interface four establishing custom forecasting adjustments;

FIGS. 20A-20B illustrates a user interface for entering performance goals in the performance goals/targets manager;

FIGS. 25A-25B illustrates a graphical user interface generated by the rate card manager;

FIG. 28 illustrates the top-level pricing analysis function manager;

DETAILED DESCRIPTION

Figure 1:
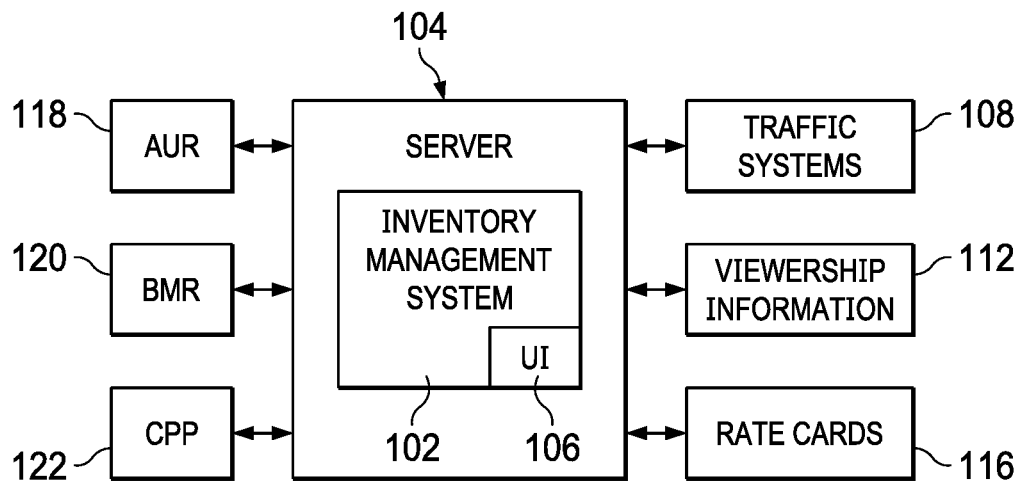
FIG. 1 illustrates an inventory management system operating environment.

Referring now to the drawings, wherein like reference numbers are used herein to designate like elements throughout, the various views and embodiments of a system and method for advertising inventory management for a cable operator are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated an inventory management system operating environment according to the present disclosure. The inventory management system 102 is implemented upon a server or other type of computer 104 for providing the various operations and functionalities described herein below. The inventory management system 102 provides an inventory and pricing system that allows a cable operator to provide an enterprise view of inventory availability and pricing performance. The inventory management system 102 enhances inventory analysis, provides insight into client buying behavior, enhances market level performance tracking and dynamically provides a pricing guide based on various historical and projected variables. The inventory management system 102 provides quick access to high level enterprise information through the user interface 106 as well as drill down capabilities for division, region, territory, zone, network, daypart, time part information. The inventory management system 102 interacts with a number of external data sources to enable the compilation of data enabling a unified view of inventory and pricing factors from the external data sources. These external data sources and factors include but are not limited to Traffic Systems 108, viewership information 112 (i.e. Nielsen ratings 112 and Set-Top Box), rate cards 116, AUR (average unit rate) 118, BMR (bench mark rate) 120 and CPP (cost per point) 122. Some of the sources were previously individually available to sales personnel of a cable operator to assist them in their marketing and sales efforts, but compilations of the data in a unified enterprise and lower level formats were not previously available. While the following descriptions is made with respect to the sales and management of advertising for cable television systems, it will be appreciated that the system is applicable in a similar fashion to the sales and management of advertising for broadcast television systems and radio systems.

Figure 2:
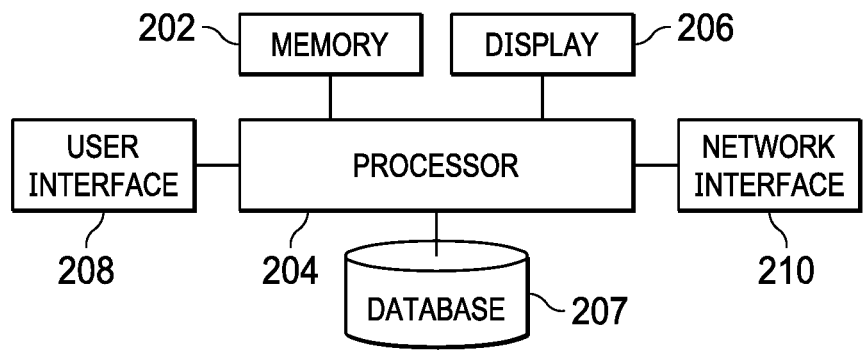
FIG. 2 illustrates a functional block diagram of a server for implementing an inventory management system.

Referring now to FIG. 2, there is provided a functional block diagram of the server 104 used for implementing the inventory management system 102 described herein. The memory 202 stores the code and instructions for implementing the inventory management system 102. The inventory management system 102 stored in the memory 202 cause a processor 204 to perform the various functionalities and processes described herein for displaying the user interface 106 on an associated display 206. A database 207 stores "big data" that is processed and displayed by the system. The user interface 208 allows the user to interact with the inventory management system 102 and display desired types of information on the display 206. The user interface 208 enables the user to control the type and level of information being presented for the inventory and pricing management system 102. A network interface 210 enables the inventory management system 102 to access external data sources such as those described hereinabove with respect to FIG. 1.

Figure 3:
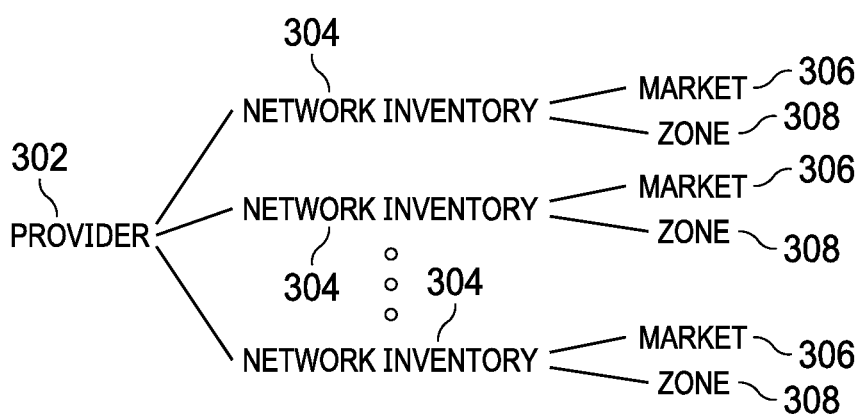
FIG. 3 illustrates expansion of data issues arising in an advertising inventory situation for a cable operators.

FIG. 3 illustrates the expansion of data issues arising in an advertising inventory situation for a cable operator. The cable operator 302 provides a variety of network inventories 304. Each network inventory 304 represents a particular cable network that is being provided by the cable operator 302 such as ESPN, A&E, Turner Network Television, local channel affiliates and any other number of cable networks. Each of these networks provides a variety of advertising opportunities occurring over the course of a 24-hour period. At the enterprise-level, this potentially provides hundreds of possible advertising inventories that would need to be marketed and sold. Each of the network inventories 304 may be further broken down into available advertising sales entities at for example a market level 306 and/or a zone level 308. This further increases the amount of information with respect to the available advertising inventory that must be tracked, managed and priced by the cable operator 302.

Figure 4:
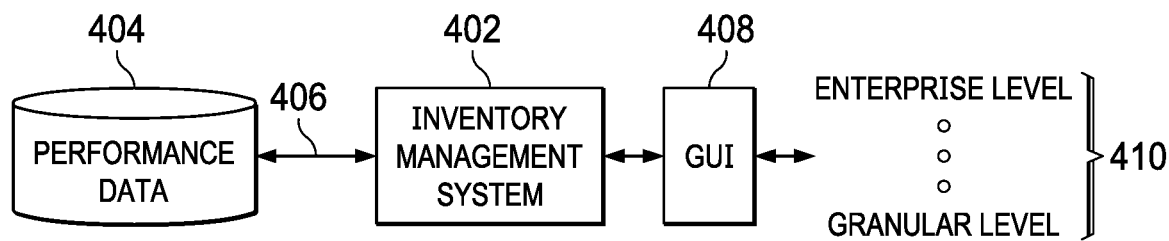
FIG. 4 illustrates an inventory management system.

The solution to the problem illustrated in FIG. 3 is an inventory management system 402 such as that illustrated in FIG. 4. The inventory management system 402 accesses performance database 404 over a network communications link 406. The performance database 404 may be located at one or more differing locations and may comprise a variety of different types of data relating to network advertising inventory. Performance data from the performance database 404 is downloaded over the network communications link or links 406 into the inventory management system 402 and combined from the multiple sources into a single database. The inventory management system 402 processes and combines the data from the multiple sources into a single database and displays the data relating to the advertising inventory in a variety of manners as will be described more fully herein below for display upon a graphical user interface 408 associated with the inventory management system 402. The inventory management system 402 may process the provided performance data to display advertising inventory information from the enterprise-level to the granular level and at a variety of levels in between as shown generally at 410.

Figure 5:
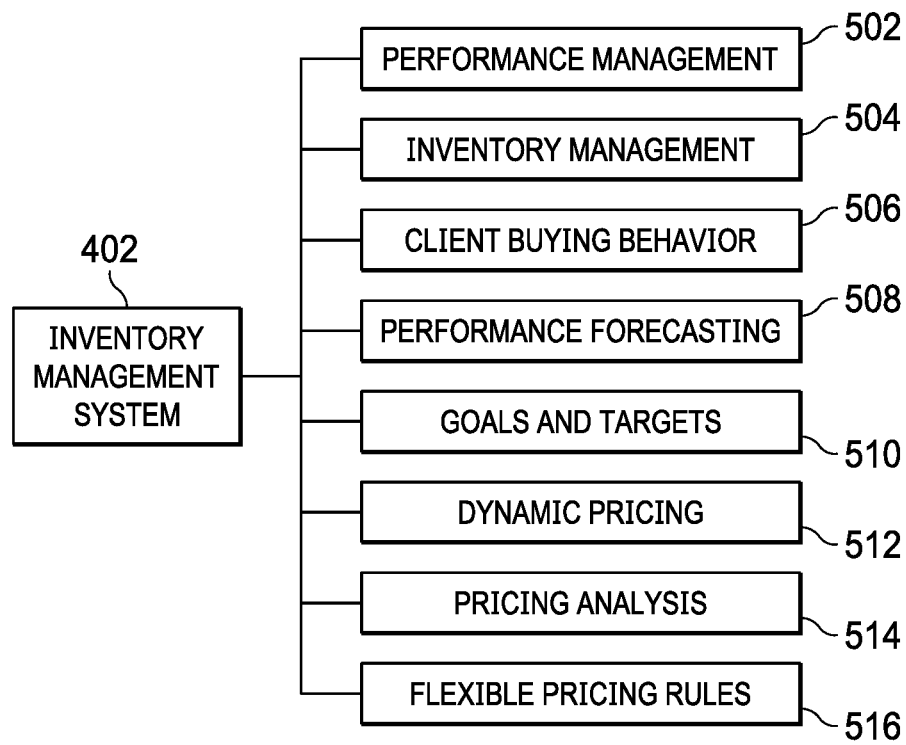
FIG. 5 illustrates the various functionalities of the inventory management system.

The various functionalities that may be provided by the inventory management system 402 are more particularly illustrated in FIG. 5. These functionalities include performance management 502, inventory management 504, client buying behavior management 506, performance forecasting management 508, goals and targets management 510, dynamic pricing management 512, pricing analysis management and flexible pricing rules management 516. The performance manager 502 enables advertising operators to view key metrics across multiple levels of an organization with respect to past/present/future performance levels with respect to the metrics. The inventory manager 504 allows advertising operators the ability to track their total inventory, the demand on inventory (what is sold), the available inventory (what is available to sell) the value of the inventory from a market perspective, the current price of their inventory according to the rate card, the current average unit rate (AUR) of the inventory and current total revenues provided from inventory. Client buying behavior manager 506 allows advertising operators to analyze the buying behavior of clients and provide insight into who is purchasing their inventory and how the inventory is being used. Due to the fact that advertisers can change what they are purchasing at any particular point in time it can be difficult to pull historic data on a particular advertiser. The client buying behavior management 506 enables the stated to be obtained to enable, for example, proactive selling to clients.

The performance forecasting manager 508 predicts how sales will perform in the future based upon historical data or knowledge of industry, environmental or resource changes that may be happening in the future. The goals and targets manager 510 enables advertising operators to input performance goals/targets through a user interface. The goals and targets manager 510 provides a single source to capture goals across markets, zones, networks, dayparts and time parts and allows these goals to be rolled up to an enterprise level or any other user designated custom level such as division, region territory, etc. The dynamic pricing manager 512 uses a dynamic pricing engine responsive to historical and projected information, to accurately derive a suggested dynamic price (SDP) for advertising inventory. The ability to dynamically price advertising inventory enables advertising operators to optimize their pricing, to improve inventory utilization and maximize revenue potential. The pricing analysis manager 512 allows advertising operators to understand how proposed pricing changes will impact revenue, AUR, sellout levels and other performance metrics. The flexible pricing rules manager 516 allows advertising operators to develop automated and non-automated rules that can be applied to impact the Rate Card rate. These automated rules enable advertising operators to automate rules versus manually setting rules for a large number of rate cards.

Figure 6A:
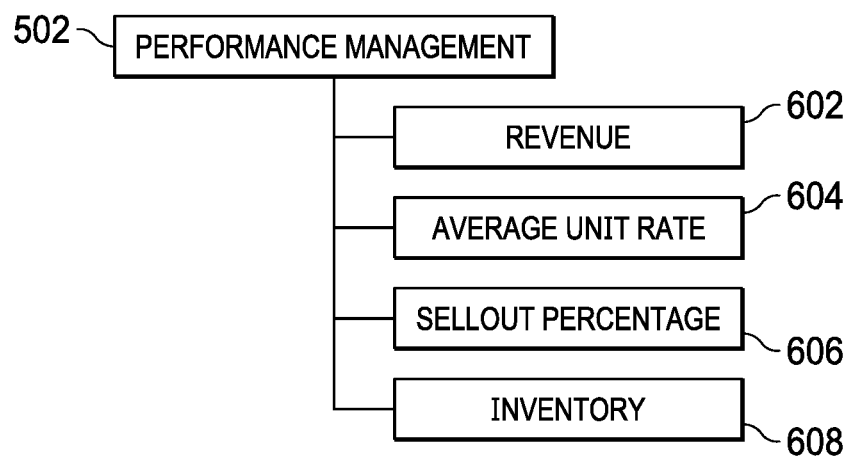
FIG. 6A illustrates performance management functionalities and associated key performance indicators.
Figure 6B:
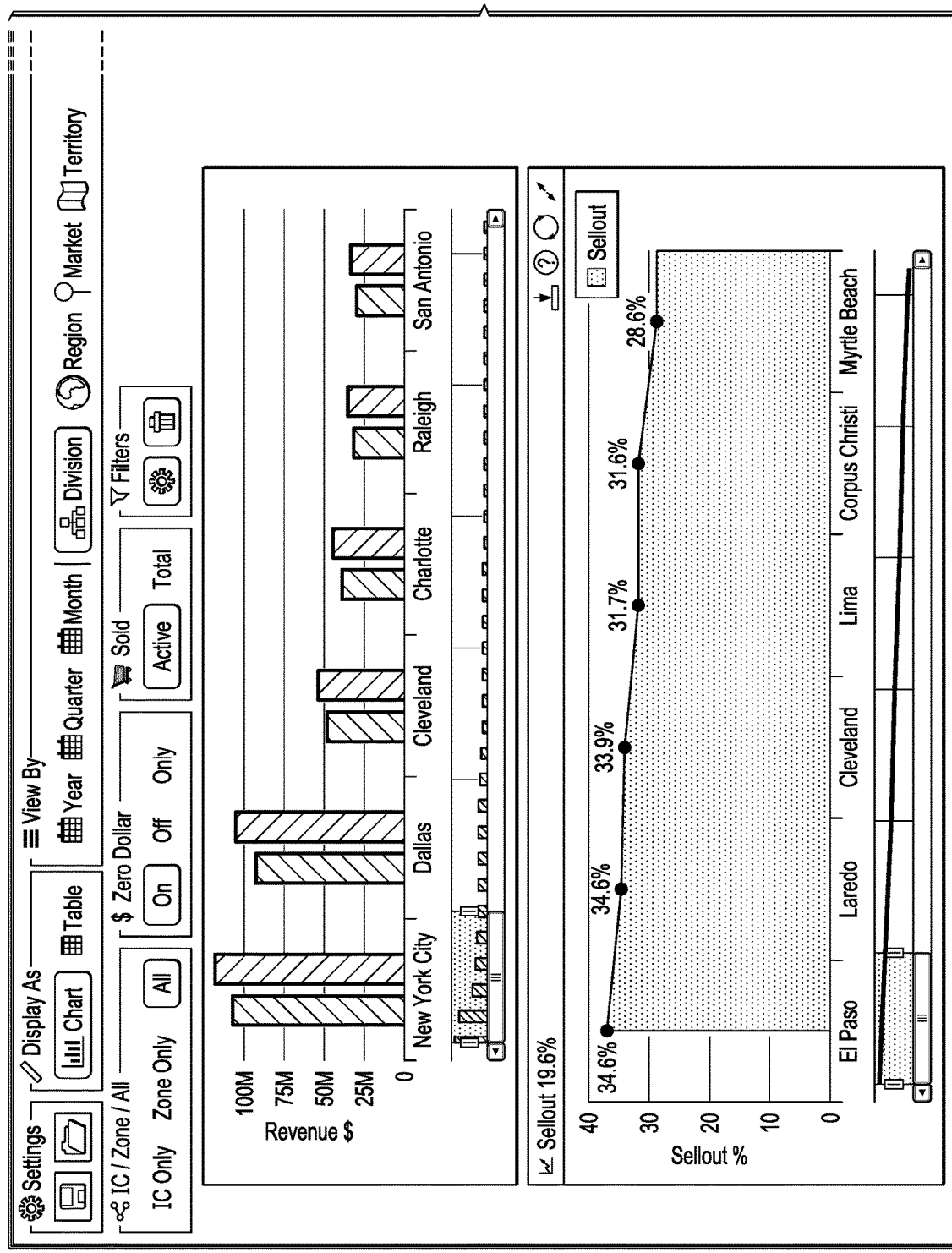
FIGS. 6B-6C illustrates a graphical user interface of the performance management functionalities relating to key performance indicators in a chart form.
Figure 6C:
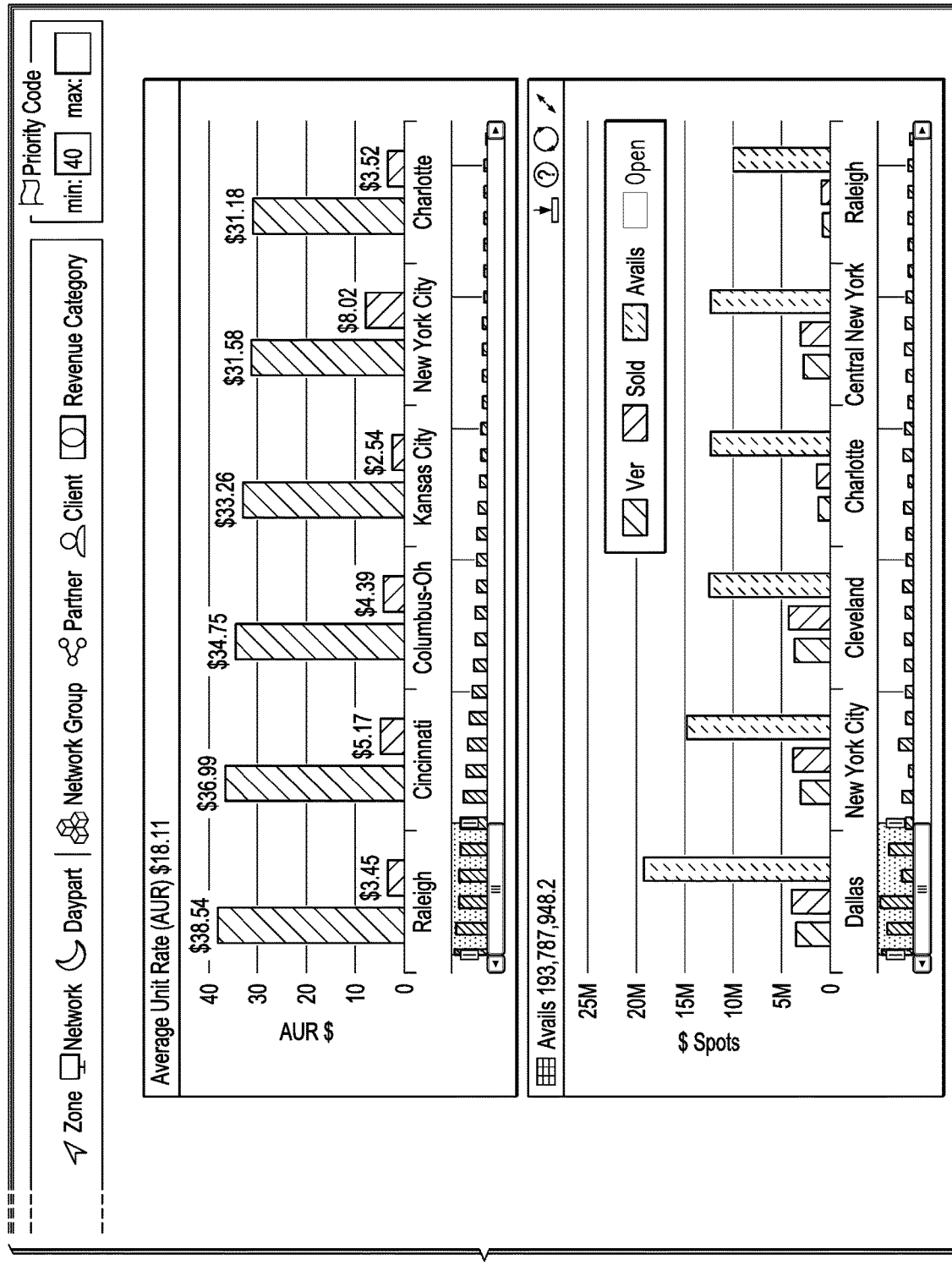

The performance manager 502 comprises a component of the inventory management system 402 enabling the display of information relating to four key performance indicators (KPIs) as shown in FIG. 6A that may be displayed through a graphical user interface with a corresponding chart (FIGS. 6B-6C) or table (FIGS. 6D-6E) depending upon a user view selection. The information represents data extracted from the database based on the chosen filters, showing up-to-date measures for each section. Each section also has the ability to drill down into subcategories. The performance manager 502 allows the viewing of the metrics across multiple levels of the organization. The information may be sliced and diced leveraging multiple parameters. The key performance indicator metrics include revenue 602, average unit rate (AUR) 604, sellout percentage 606 and inventory (available, open, sold) 608.

The revenue metrics 602 comprise both sold revenue and verified revenue. Sold revenue comprises both past, present and future sold revenue and is determined by multiplying the number of sold spots by the sold rate. Verified revenue comprises verified past revenue that is determined by multiplying the number of verified spots by the verified rate. The average unit rate metrics 604 may be shown at the division, region, market, territory, zone or network levels. The inventory management system 402 calculates four different types of average unit rates (AUR) these include sold AUR determined by dividing sold revenue by sold spots, the verified AUR determined by dividing verified revenue by verified spots, the sold eAUR determined by dividing sold revenues by available inventory and verified eAUR determined by dividing verified revenue by available inventory. The sellout percentage 606 reflects sold spots versus avails. The sellout percentage 606 is calculated by dividing sold spots by avails and multiplying the result by 100. Sold spots include unplaced spots (not scheduled spots) so that there is the potential for a sellout to be greater than 100%.

The inventory metrics 608 include a number of items such as open inventory, verified inventory and sold inventory. Open inventory reflects any unsold spots in the past/present/future. Open inventory is determined by subtracting the sold inventory from the available inventory. Users may see negative open inventory numbers on the graphical user interface if a selection is oversold. Sold inventory comprises past present and future available inventory that are either placed (scheduled) or unplaced (not scheduled) by the Traffic scheduler. Verified inventory reflects the actual verified inventory. Total inventory represents the total "sellable inventory" and excludes any unsellable inventory types. The total available inventory is normalized to 30-second increments. Thus, 120 second break would be broken down into four available inventory slots.

Figure 7:
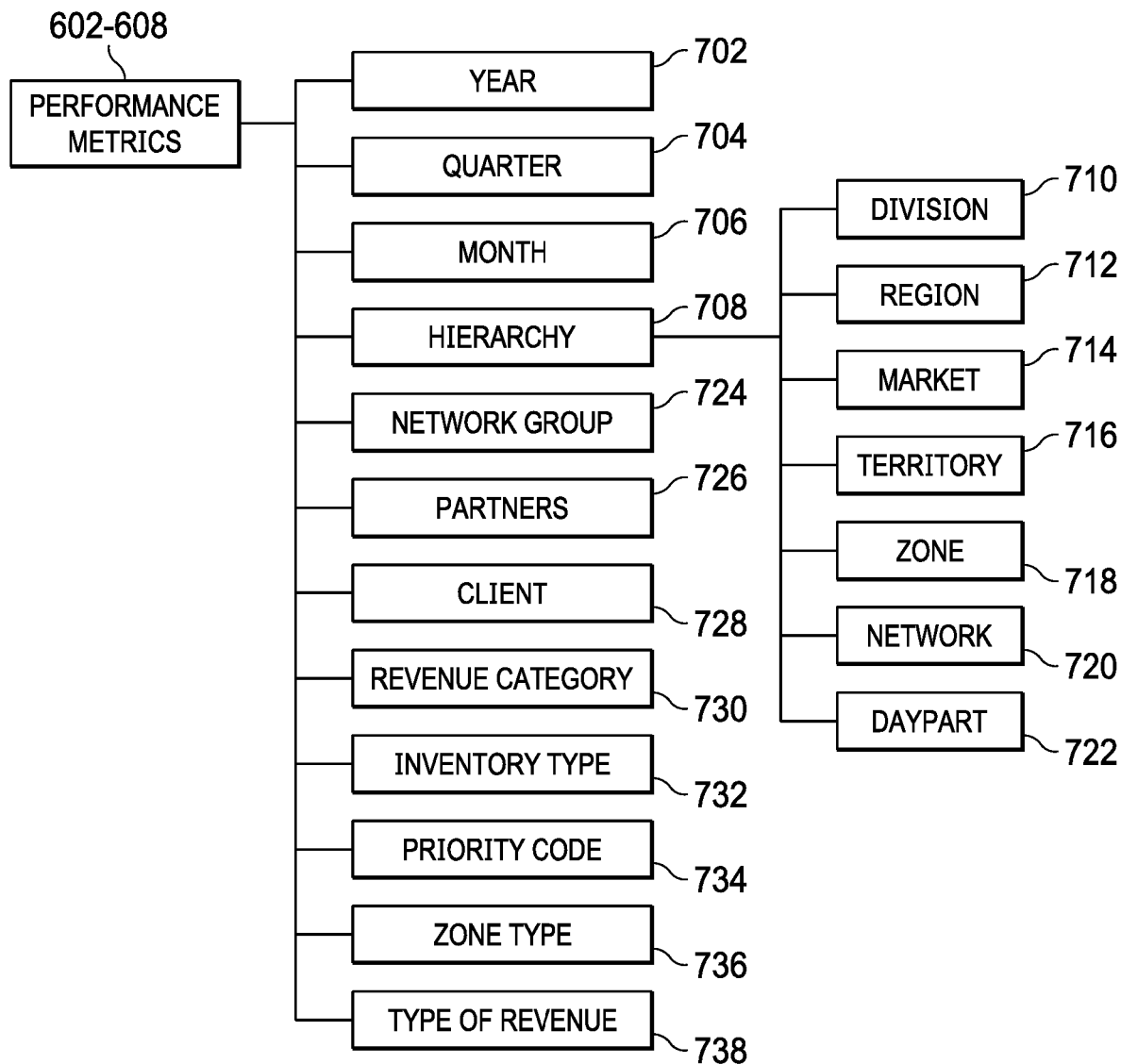
FIG. 7 illustrates various performance metrics for viewing performance data.
Figure 8A:
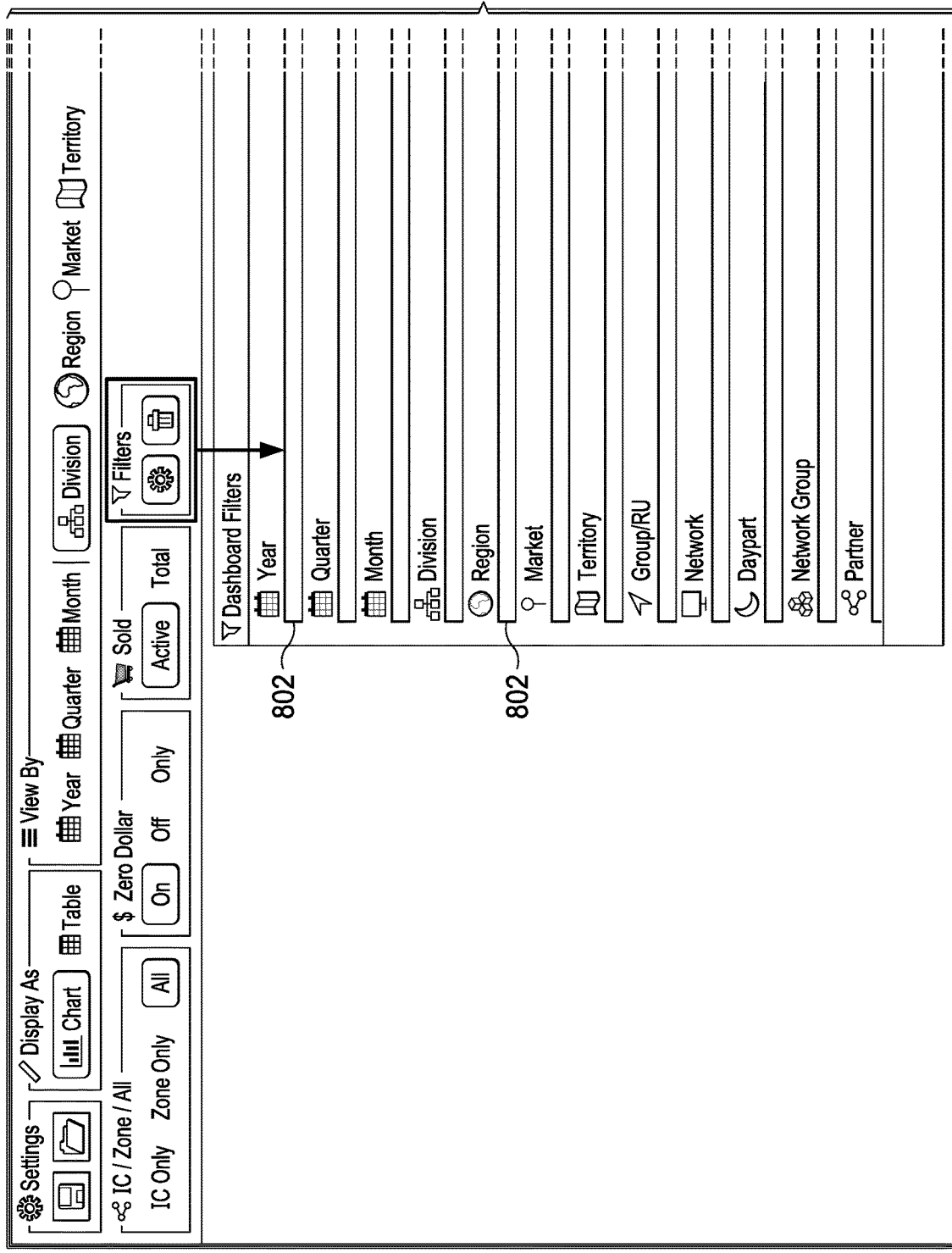
FIGS. 8A-8B illustrates a graphical user interface for entry of filtering parameters relating to performance metrics.
Figure 8B:
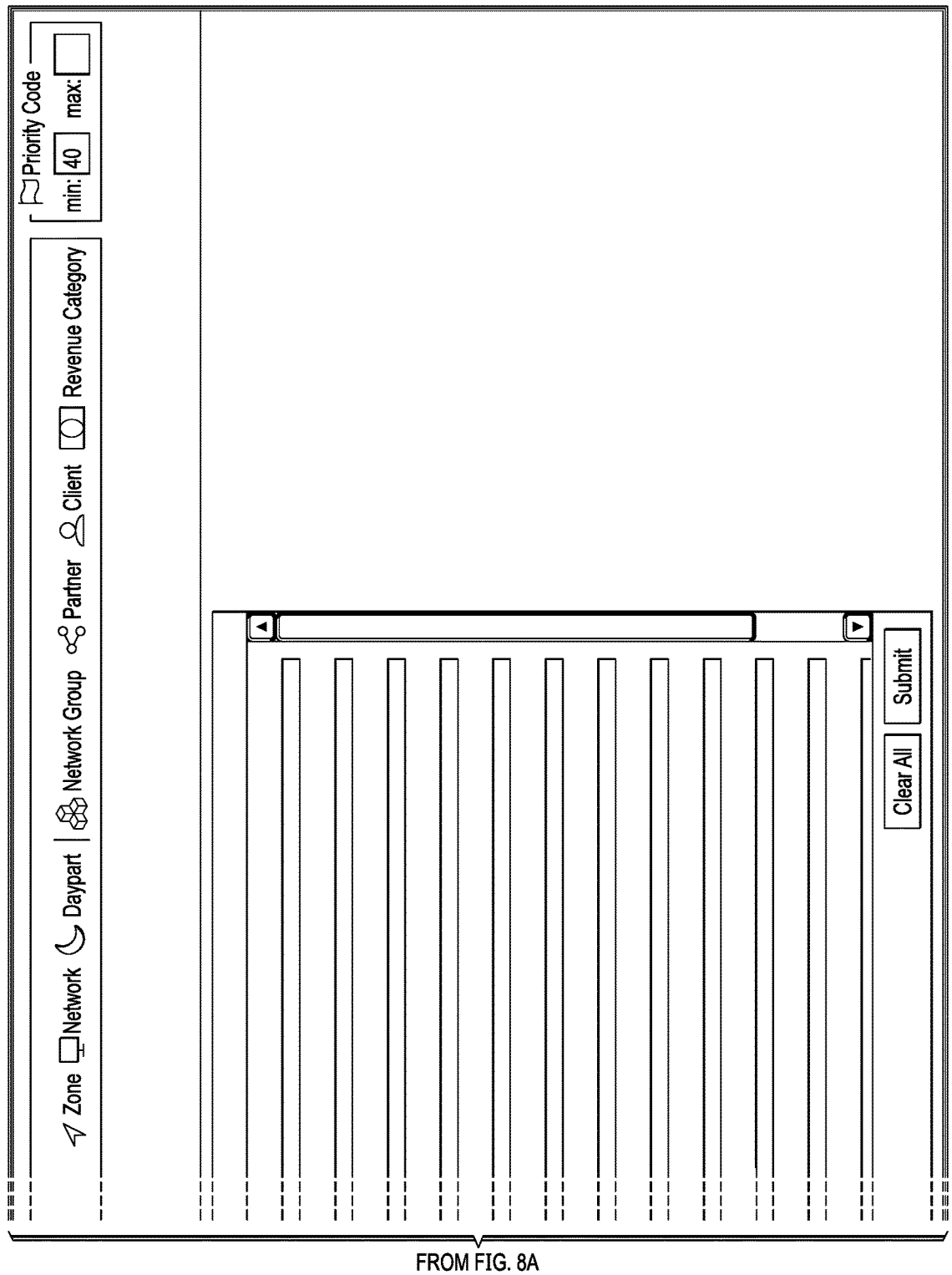

As shown in FIG. 7, each of the performance metrics 602-608 can be viewed and narrowed using a combination of parameters to provide a more detailed view. This allows the data groupings of the performance metrics 602-608 to be fully customizable. These data parameters may be viewed within the performance metrics 602-608 by clicking on the associated parameter within the graphical user interface associated with the performance functionalities. The parameters include year 702, quarter 704, month 706 and hierarchy 708. The hierarchy parameters can be further broken down into a division level 710, region level 712, market level 714, territory level 716, zone level 718, network level 720 and daypart level 722. The remaining parameters include network group 724, partner 726, client 728, revenue category 730, inventory type 732, priority code 734, zone type 736 and type of revenue 738. Without any filters, the information with respect to the performance metrics 602-608 will be displayed at the enterprise level for all available dates. The user can refine the view within the graphical user interface by any combination of the above referenced parameters using a filter drop-down menu as illustrated in FIGS. 8A-8B. Ranges may be entered into each of the fields 802 associated with previously discussed parameters in order to filter the performance metrics in a desired manner.

Figure 9A:
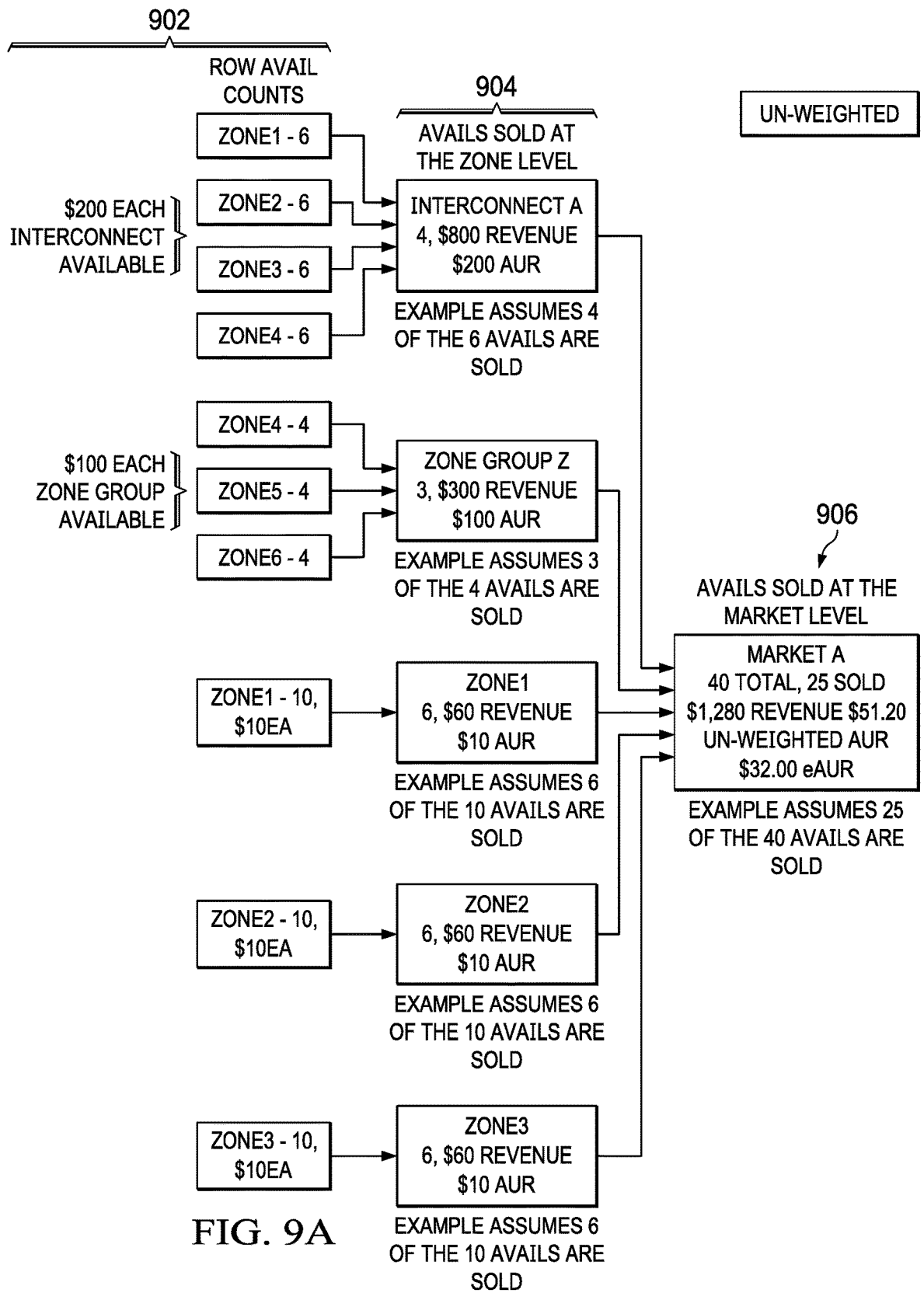
FIG. 9A illustrates unweighted inventory rollup calculations with respect to available inventory at various detail levels.

By selection of various parameters, information with respect to the performance metrics may be calculated for display within the graphical user interface using data rollups that are based upon the selected performance metrics and associated parameters. Thus, as shown in FIG. 9A, there is illustrated the unweighted inventory rollup calculations with respect to available inventory at various detail levels. Raw available inventory counts are shown for various zones at 902. The zones have inventory purchased at various average unit rates (AUR) that are grouped accordingly. The inventory sold at the zone level is indicated generally at 904 and shows the revenue generated when a determined number of available inventory is sold. Finally, the available inventory sold at the market level is shown generally at 906 and combines the total number of available inventory that was sold for calculating revenue, AUR and eAUR. The illustration provides the interconnect totals that are generated as an aggregate of various sub zones 902. The user interface will provide the user with the option to view totals by IC Only, Zone Only or All.

Figure 9B:
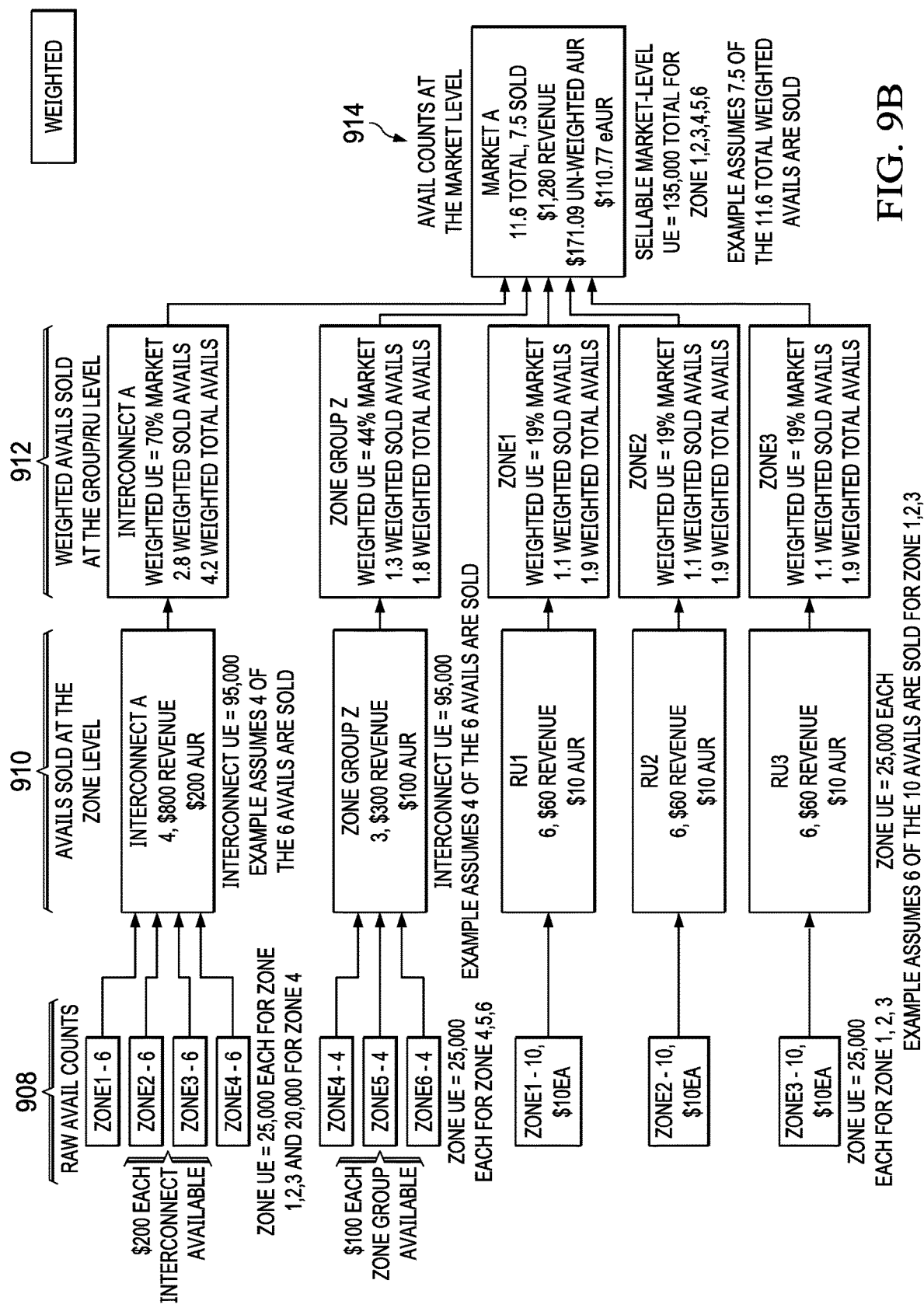
FIG. 9B illustrates weighted inventory rollup calculations with respect to available inventory at various detail levels.

In a further embodiment, FIG. 9B illustrates weighted inventory rollup calculations with respect to available inventory at various detail levels. Raw available inventory counts are shown for various zones at 908. The zones have inventory purchased at various average unit rates (AUR) that are grouped accordingly. The inventory sold at the zone level is indicated generally at 910 and shows the revenue generated when a determined number of available inventory is sold. The weighted inventory sold at the Group/RU level is indicated at 912 and shows the weighted revenue at these levels. Finally, the available inventory sold at the market level is shown generally at 914 and combines the total number of available inventory that was sold for calculating revenue, AUR and eAUR. The illustration provides the interconnect totals that are generated as an aggregate of various sub zones 902. The user interface will provide the user with the option to view totals by IC Only, Zone Only or All.

Figure 10:
FIG. 10 illustrates a drill down hierarchy available to a user through the graphical user interface.

Referring now to FIG. 10, there is illustrated the drill down hierarchy that is available to a user through the graphical user interface. As the user clicks through a chart or double clicks on a row in a table, they may drill down to differing levels. The dimensions will be automatically added to the filters at the top of the page that correspond to the users clicks. In this manner, the user can go from the division level 1010, to the region level 1012, to the market level 1014, to the territory level 1016, to the zone level 1018, to the network level 1020 and finally to the daypart level 1022.

Therefore, the performance management manager 502 enables aggregation of a variety of parameters associated with key metrics across all of the advertising operators traffic systems. In cable advertising, the amount of inventory is overwhelming based upon the number of networks that must be managed. This complexity is compounded when markets are added. Advertising operators need visibility of the available inventory for a specific timepart or daypart, program, network, zone and market. Sometimes network providers need visibility at a higher level than the market (region or subdivision). The performance manager 502 provides an easy way to navigate through this complexity and view information at the enterprise-level while enabling drill down to a very granular level. This capability improves the decision-making capabilities of the cable network providers, enhances their ability to effectively price their available inventory and improves inventory utilization while maximizing revenue potential.

Figure 11:
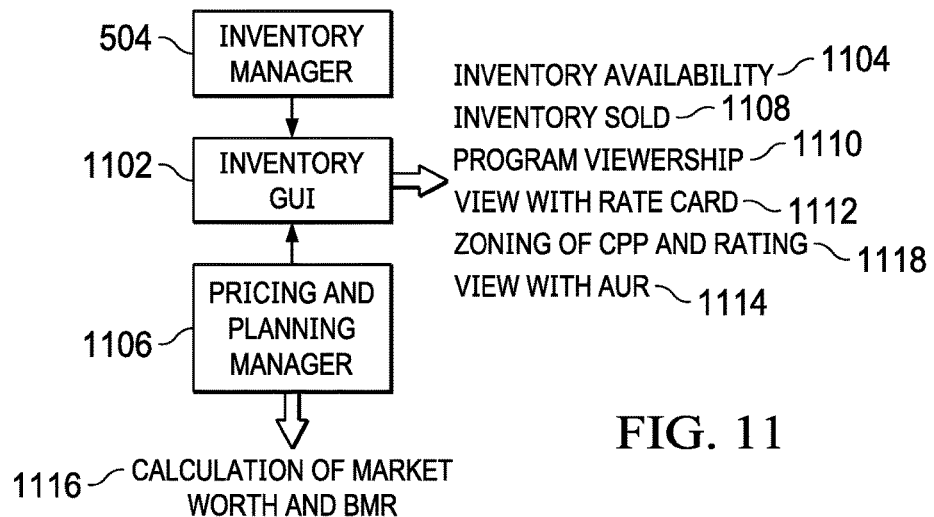
FIG. 11 illustrates the inventory manager of the inventory management system.

Referring now to FIG. 11 there is more particularly illustrated the inventory manager 504. The inventory manager 504 allows advertising operators the ability to clearly view through an inventory graphical user interface 1102 operating responsive to the inventory manager 504 total inventory, the demand on the inventory (what is sold), the available inventory (what is open or available to sell), what the inventory is worth from a market perspective, the current internally published price of the inventory (rate card), the current average unit rate (AUR) of the inventory and the current total revenue of the inventory. All of this information is viewable through the graphical user interface 1102 which will be more fully illustrated and described below. The pricing and planning manager 1106 operates in conjunction with the inventory manager 504 to enable the inventory GUI 1102 to provide various views of information relevant to inventory management by a cable network provider.

The inventory manager 504 provides a number of views of the advertising inventory of a cable service operator through the graphical user interface 1102 that enables viewing of critical components used in the inventory management capabilities. These include an inventory availability view 1104. The inventory availability view 1104 provides a view of the advertising inventory that is available to sell to advertisers. The inventory sold view 1108 provides a view of the inventory that is already sold to advertisers and is no longer available for sale. The program viewership 1110 provides Viewership information (ie: Nielsen or Set Top Box) that comprises the industry standards on the number of people/eyeballs that are viewing a particular program or daypart. This provides valuable information to the advertising sales person and assists in pricing strategies. View with rate card 1112 enables the display of a current suggested price for an advertising inventory slot alongside an established rate card rate for the advertising inventory slot. The current suggested price is determined responsive to information provided by the pricing and planning manager 1106.

A view alongside average unit rate (AUR) 1114 displays the inventory slots that are being sold alongside their current AUR. The calculation of market worth and BMR 1116 may also be displayed upon the inventory GUI 1102 but information for this is also provided from the pricing and planning manager 1106. The calculation of market worth and BMR 1116 is accomplished using industry-standard inputs to determine the suggested "going rate" of what the market can bear regardless of the actual supply and demand of advertising inventory. The zoning of CPP and rating view 1118 provides the ability to see CPP (cost per point) and viewership not only at the market level but also at the zone level.

Figure 12:
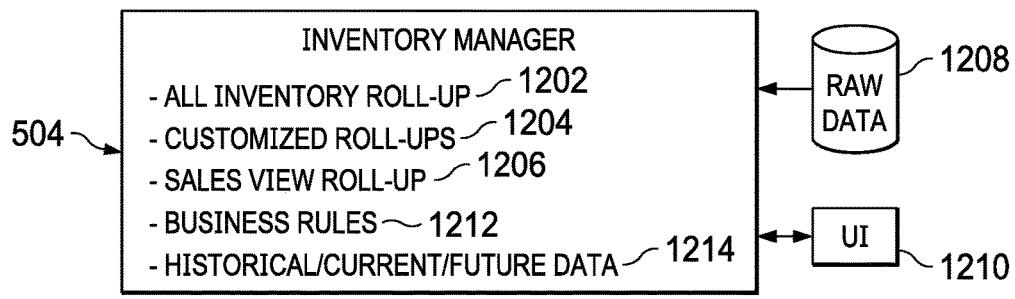
FIG. 12 illustrates various functionalities of the inventory manager.

Referring now also to FIG. 12, the inventory manager 504 allows users to see an enterprise level view of all inventory via an all inventory rollup functionality 1202. An enterprise level inventory view was not previously available to MVPDs since the inventory was located on separate Traffic servers. The inventory manager 504 further provides the ability for users to generate customized rollups 1204 for zone groups, territories or regions. The inventory manager 504 provides for a sales view roll-up 1206 so that the available inventory are not overstated for grouping of zones that are sold together. This minimizes the manual effort of pricing and sales managing the inventory for these rolled-up groups. The inventory manager 504 for will aggregate multiple data sources 1208 such as Traffic servers, viewership information (i.e. Nielsen and STB), rate cards, AUR, BMR and CPP into a single user interface 1210. This enables a reduction in the number of touch points that a user is required to make to analyze inventory and make pricing decisions.

The inventory manager 504 may also implement various business rules 1212 that may be applied to the raw data 1208 to adjust the output in the user interface 1210. For example, historical data sources normalize to a 60 second break (60 seconds equals one available inventory unit). The inventory manager 504 can manipulate the information to normalize to a 30-second break which is how most media is sold/purchased. Business rules 1212 may also be set to hide or show certain aspects of the data (i.e.: showing/hiding certain networks or inventory types on the user interface 1210). The inventory manager 504 may also track and display historical/current and future data 1214 regardless of which server the data resides upon. Thus, when markets are moved from one Traffic system server to another the information may be captured. This allows the user to see a seamless transition of data within the user interface 1210 for easy data trend analysis.

Figure 13A:
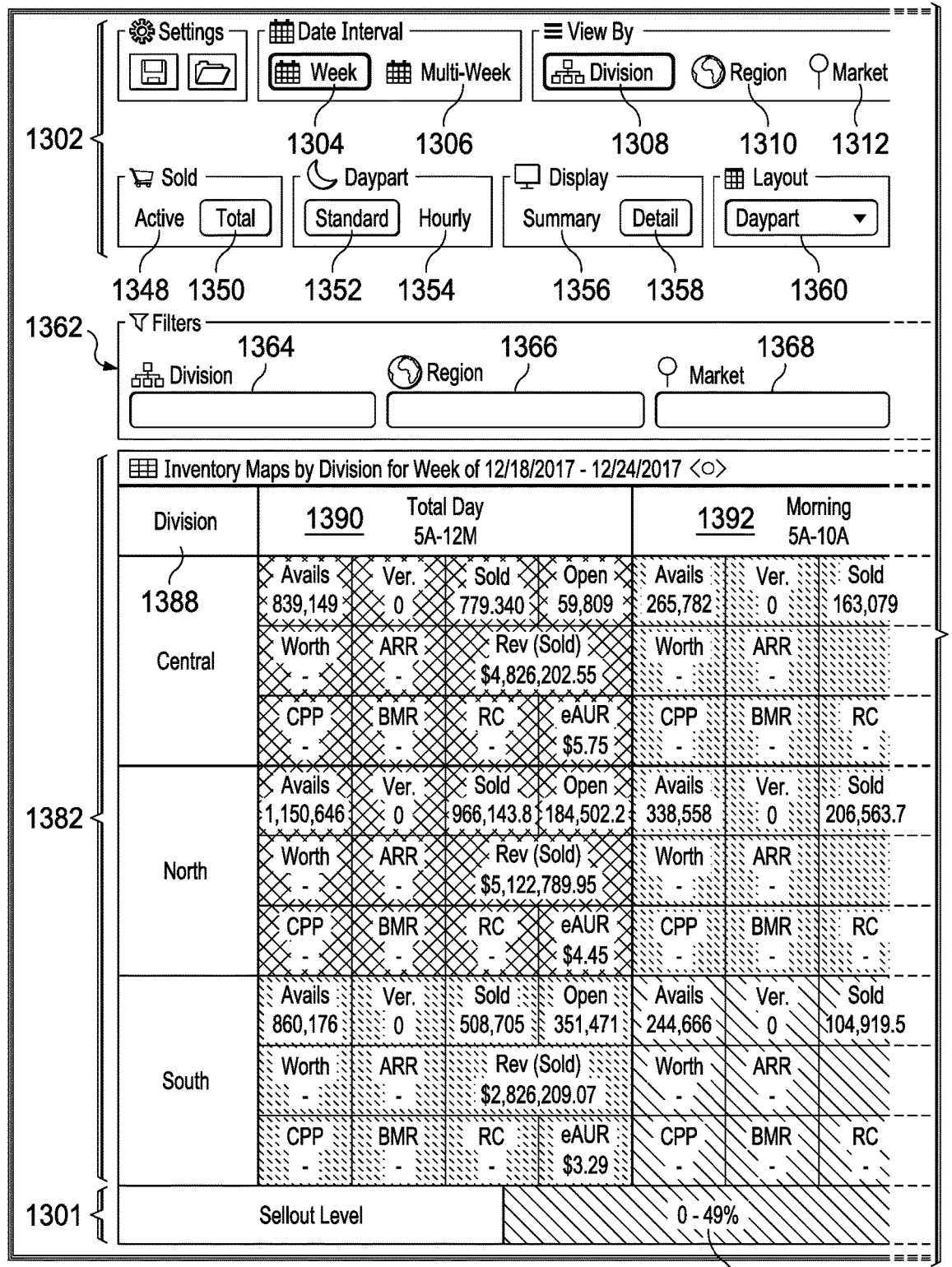
Figure 13B:
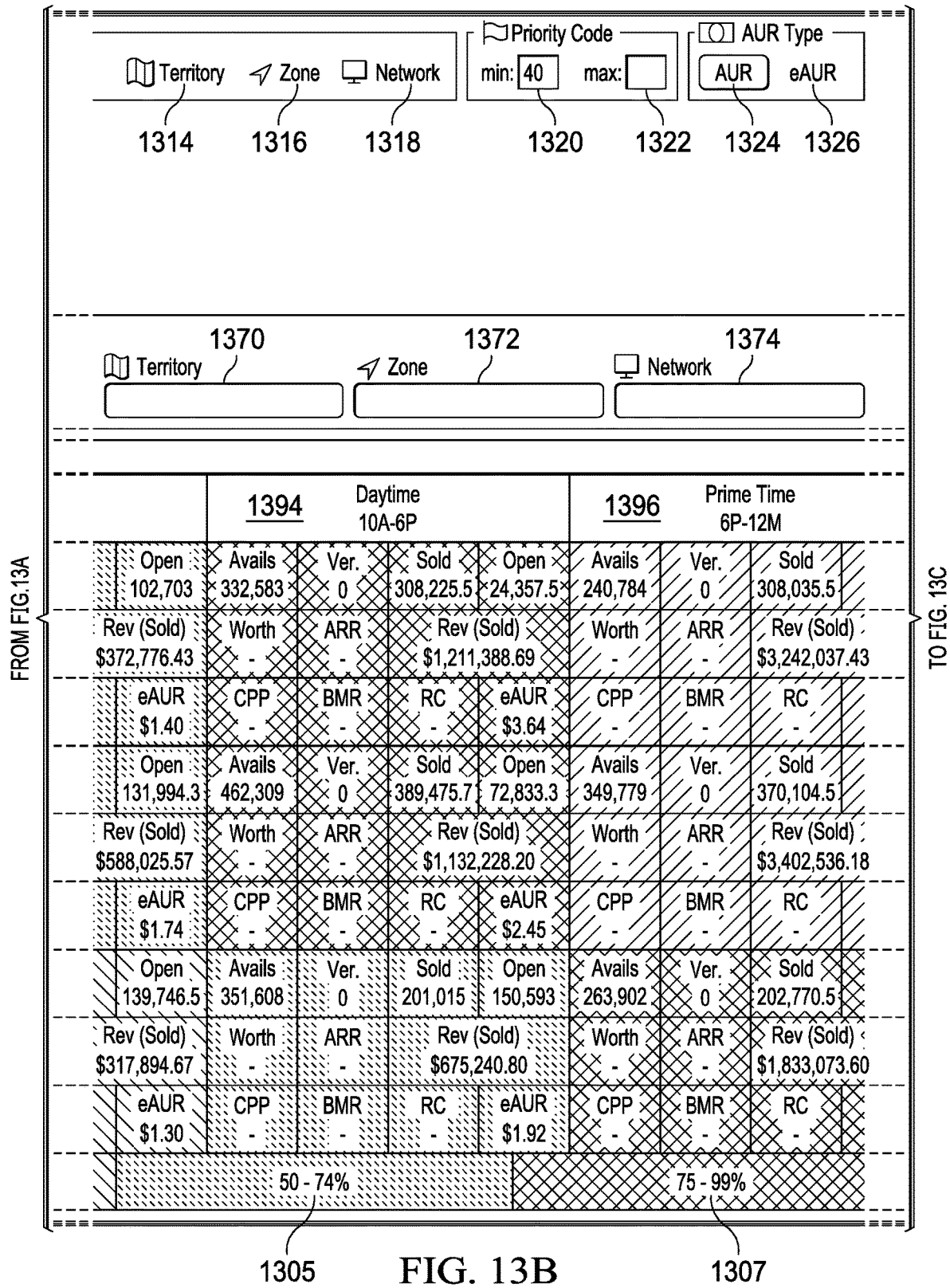

The data groupings that may still be provided by the inventory manager 504 utilizing the above rules are fully customizable through the customized roll-ups 1204 as mentioned above. The data can be viewed according to the following dimensions by clicking on the dimension from a top inventory map data ribbon 1302 as shown in FIGS. 13A-13C. FIGS. 13A-13C illustrates an inventory map showing the available advertising inventory according to designated factors using the data groupings buttons. The data interval may be selected by week using a week button 1304 or by multiple weeks using a multi-week button 1306. The user can toggle between week and multiweek by clicking on the appropriate data interval button. The selection will update the inventory map section 1382 for all corresponding KPIs. The view by may be selected to illustrate a particular division 1308, region 1310, market 1312, territory 1314, zone 1316 or network 1318. The view by buttons enable a user to select between multiple view by options that will update the inventory map section 1382 for all corresponding KPIs.

Inventory associated with particular priority codes may be displayed using a priority code minimum field 1320 and priority code maximum field 1322. The priority codes enable the user to select a minimum and/or maximum priority code by entry in to the associated box. This will update the inventory map section 1382 for all corresponding KPIs. AUR types may be displayed responsive to selection of an AUR button 1324 and eAUR button 1326. The user can toggle between AUR and eAUR by clicking on the appropriate AUR button. The selection will update the inventory map section 1382 for all corresponding KPIs. Whether or not the display data is weighted can be controlled by a yes button 1328 or a no button 1330 indicating whether or not to weight the data. The selection will update the inventory map section 1382 for all corresponding KPIs. Within the IC/Zone/All section the user can toggle between showing only interconnect inventory using the IC only button 1332, zone level inventory using the zone only button 1334, or all inventory using the all button 1336. The selection will update the inventory map section 1382 for all corresponding KPIs.

The revenue option section enables a user to toggle between showing verified or sold inventory. Button 1338 is used to show verified inventory, and button 1340 is used show sold inventory. The selection will update the inventory map section 1382 for all corresponding KPIs. The user can view the Spots/AUR/Sellout/Avails with zero dollar spots using the ON zero dollars button 1342, and without zero dollar spots using the OFF zero dollars button 1344. Only zero dollar spots may be used by selecting the only zero dollars button 1346. The selection will update the inventory map section 1382 for all corresponding KPIs. Users can see the Spots/Revenue/AUR/Sellout/Avails without dropped spots by selecting the active button 1348 and with dropped spots by selecting the total button 1350. The selection will update the inventory map section 1382 for all corresponding KPIs. The daypart section enables the user to toggle between standard and hourly dayparts using standard button 1352 or hourly button 1354. The standard button 1352 displays six diamond-standard daypart (total day 5 a-12 m, morning 5 a-10 a, daytime 10 a-6 p, prime time 6 p-12 m, late-night 12 m-2 a and overnight 2 a-5 a). The hourly button 1354 displays each individual hour throughout the day. The display can also be established in a summary configuration 1356 or detailed configuration 1358. The detail configuration 1358 shows all 11 KPIs while the summary configuration 1356 shows Sold, Open and RC (rate card).

The inventory map screen layout may be selected via a drop-down menu 1360. The drop-down menu 1360 may display layout options including week with daypart, day with daypart, daypart or daypart with day. The week with daypart configuration shows the week across the top of the column and the dayparts down the left-hand side as the rows along with the view by selection. In the day with daypart configuration, the day of the week is shown across the top as the column and the dayparts are shown down the left hand side as the rows along with the view by selection. In the daypart configuration, the daypart is shown across the top as the column in the view by is shown down the left-hand side as the rows. In the daypart with day configuration, the daypart is shown across the top is the column and the days of the week are shown down the left-hand side as the rows along with the view by selection. In each configuration, if the date interval multiweek is selected the configuration will also include six weeks down the left-hand side.

A dimension filters section 1362 include filter boxes for filtering the data according to division 1364, region 1366, market 1368, territory 1370, zone 1372, network 1374, inventory type 1376, daypart 1378 and calendar day 1380. The dimension filters 1362 can be used to refine the view to any combination of the previously discussed dimensions using the filters multi-select drop down.

The inventory map portion 1382 displays the information according to the buttons and filters selected in the data ribbon 1302. FIG. 13 illustrates inventory data displayed according to divisions 1384 that are broken down into Central, North and South divisions. The inventory is also displayed according to various times of the day including total day 1390, mornings 1392, daytime 1394, prime time 1396, late-night 1398 and overnight 1399. Within each of these periods of time of the inventory map a number of key performance indicators (KPIs) are represented within individual boxes by daypart versus the view by selection chosen. These KPIs represent data extracted from a Traffic System server or represented by Viewership Information for the chosen filters, showing up-to-date measures for each section, which also have the ability to drill down into subcategories. These performance indicators include Avails (available inventory), Verified (verified spots), Sold (sold spots), Open (open spots), Worth (worth of inventory), ARR (average rating rate), Rev (sold) (revenue sold), CPP (cost per point), BMR (Bench Mark Rate), RC (rate card) and AUR (maybe toggle between AUR and eAUR). Finally, using a color coding system the sellout levels 1301 may be illustrated by colors associated with various percentage levels including 0 to 49% 1303, 50% to 74% 1305, 75% to 99% 1307, 100% 1309 and unavailable inventory 1311. The inventory map section 1382 illustrated in FIG. 13 illustrates only one implementation, and it should be appreciated that the particular view will be altered based upon the various data groupings that are selected via the data ribbon 1302.

Figure 14:
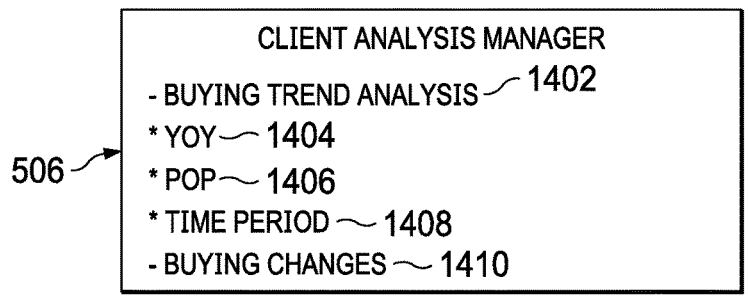
FIG. 14 illustrates functionalities of the client analysis manager.

Referring now to FIG. 14, the client analysis manager 506 provides cable network operators the ability to analyze the buying behavior of their clients and provide insights into who is buying advertising inventory and how the inventory is being considered. Advertisers may change what they are purchasing at any particular point in time. Pricing and sales managers may find it difficult to pull historic data on how a particular advertiser has been previously purchasing thus making proactive sales difficult. The client analysis manager 506 enables buying trend analysis functionalities 1402 to analyze historical client purchasing information. The buying trend analysis functionalities 1402 enable advertisers buying trends to be analyzed year-over-year (YoY) 1404, period-over-period (PoP) 1406 or by other time periods such as quarter or month 1408. For example, at the quarter level the user can look up Q3 for 2017 and compare it to Q3 for 2016, year-over-year or Q2 for 2017 period-over-period. At the month level, the user could look at 09/18 and compare it to 09/17 YoY or 08/18 PoP. The user can view buying changes 1410 such as number of zones purchased, number of networks, number of dayparts, revenue, spots and AUR.

The ability to view client buying trends using the client analysis manager 506 provides the ability to see opportunities for future buys or allow sales assistants to work on making good replacement options. The client analysis manager 506 allows managers/executives to see buying/selling trends at an overall view level. The client analysis manager 506 shows users how certain network/daypart/zone/markets are being purchased, what type of advertisers are making these purchases and if those advertisers are buying consistently over time.

Figure 15A:
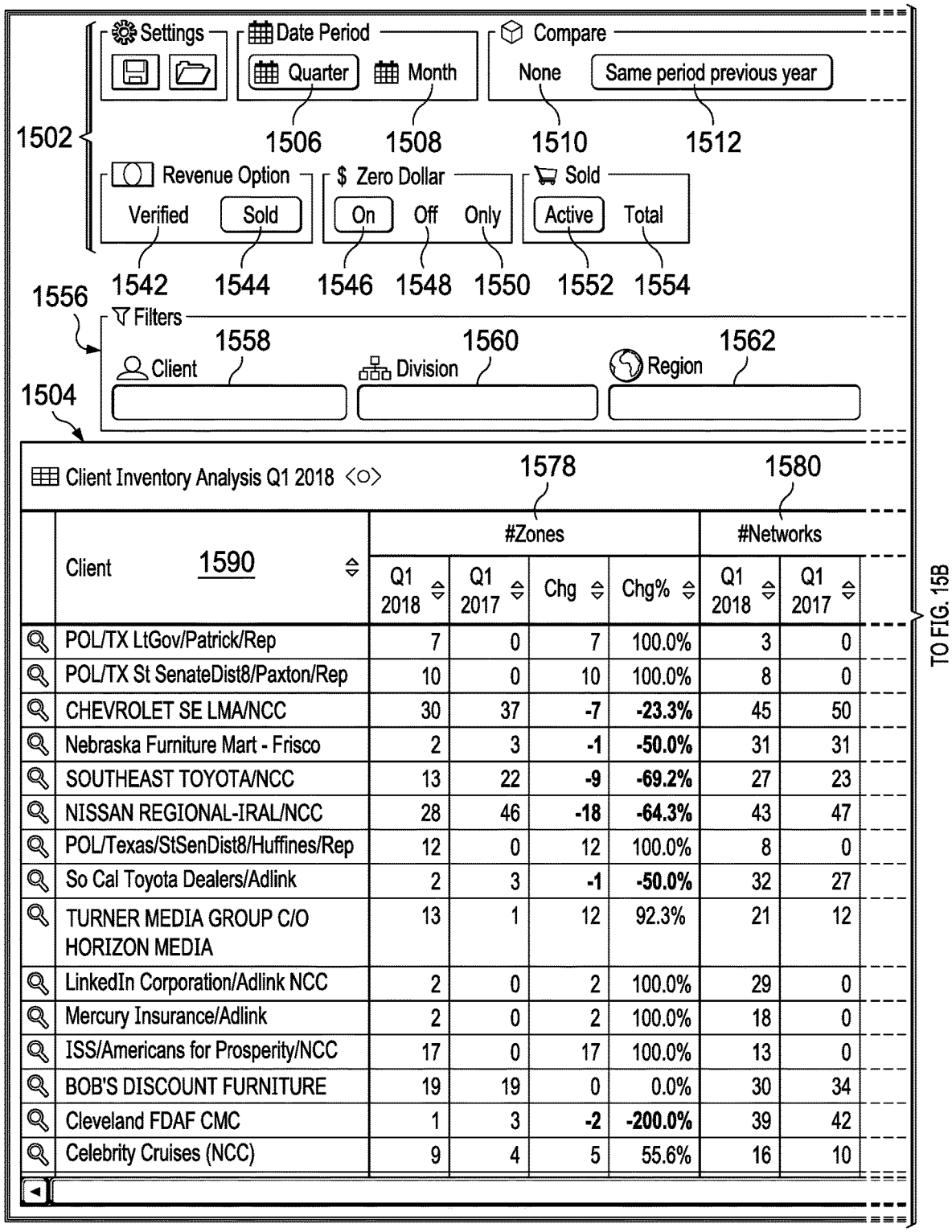

Referring now to FIGS. 15A-15C, there is illustrated the client inventory analysis overview screen that provides the information aggregated by the client analysis manager 506. The client inventory analysis overview screen includes a client inventory analysis data ribbon portion 1502 and a client inventory analysis data portion 1504. The data can be viewed according to the following dimensions by clicking on the dimension within the data ribbon 1502. The client inventory analysis data groupings are fully customizable. The data can be viewed by clicking on the below discussed dimensions within the client inventory analysis data ribbon 1502. The user can toggle the view within the client inventory analysis portion 1504 between quarter and month by clicking on the quarter button 1506 and month button 1508, respectively. The compare section enables the user to compare two data sets. The user can compare view data for the various KPIs versus a same period for previous year using the button 1312 and data versus a previous period using button 1314. No comparison may be performed by selecting button 1510. This causes only the data for the selected period to be displayed.

The view by may be selected to illustrate a particular client 1516, division 1518, region 1520, market 1522, territory 1524, zone 1526, network 1528 or daypart 1530. The view by tabs enable a user to select between multiple view by options that will update the client inventory analysis section 1504 for all corresponding KPIs. The priority codes enable the user to select a minimum and/or maximum priority code by entry in to the associated box 1532, 1534. This will update the client inventory analysis section 1504 for all corresponding KPIs. Within the IC/Zone/All section the user can toggle between showing only interconnect inventory using the IC only tab 1536, zone level inventory using the zone only tab 1538, or all inventory using the all tab 1540. The selection will update the inventory analysis section 1504 for all corresponding KPIs. The revenue option section enables a user to toggle between showing verified or sold inventory. Tab 1542 is used to show verified inventory and tab 1544 is used show sold inventory. The selection will update the client inventory analysis section 1504 for all corresponding KPIs. The user can view the Spots/AUR/Sellout/Avails with zero dollar spots using the ON zero dollars tab 1546, and without zero dollar spots using the OFF zero dollars tab 1548. Only zero dollar spots may be used by selecting the ONLY zero dollars tab 1550. The selection will update the client inventory analysis section 1504 for all corresponding KPIs. Users can see the Spots/Revenue/AUR/Sellout/Avails without dropped spots by selecting the active tab 1552 and with dropped spots by selecting the total tab 1554. The selection will update the client inventory analysis section 1504 for all corresponding KPIs.

A dimension filters section 1556 includes filter boxes for filtering the data according to client 1558, division 1560, region 1562, market 1564, territory 1566, zone 1568, network 1570, daypart 1574 and inventory type 1576. The dimension filters 1556 can be used to refine the view to any combination of the previously discussed mentioned using the filters multi-select drop down.

The client analysis inventory section 1504 includes a plurality of key performance indicators (KPIs) that are displayed in accordance with the selections made within the data ribbon 1502. The six KPIs are each represented as a column header including # zones 1578, # networks 1580, # dayparts 1582, revenue (verified or sold) 1584, spots (verified or sold) 1586 and AUR (verified or sold) 1588. Each of the KPI values has the time periods selected within the data ribbon for comparison, the amount of change and the percentage change. The rows of the client analysis inventory section 1504 are the individual clients 1590 which are being analyzed. The values inserted within the KPIs represent data extracted from traffic system servers based upon the chosen filters, showing up-to-date measures for each section which may further be drilled down to into subcategories.

Figure 16:
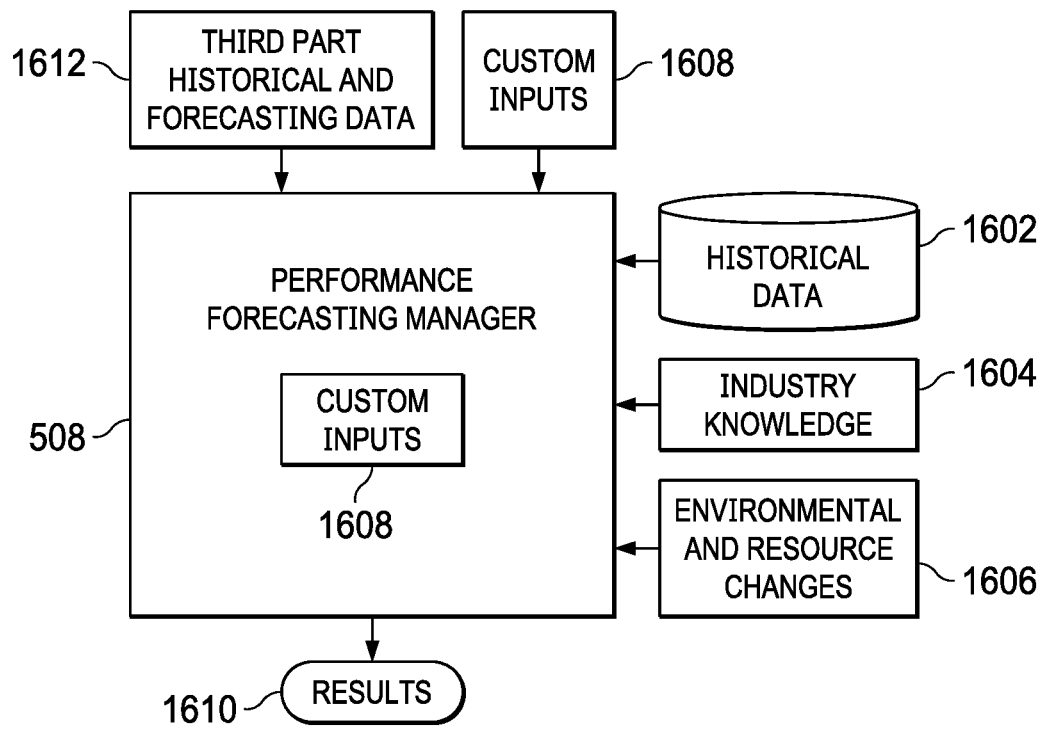
FIG. 16 illustrates a performance forecasting manager.

Referring now to FIG. 16 there is more particularly illustrated the performance forecasting manager 508. The performance forecasting manager 508 predicts how sales will perform in the future based upon historical data 1602, industry knowledge and 1604 and environmental and resource changes 1606 that may happen in the future. The performance forecasting manager 508 utilizes a forecasting model 1608 to aggregate all of the historical performance information 1602 and leverage the custom inputs 1608 to forecast future performance information results 1610. The historical performance information 1602 includes information such as sellout level, AUR, BMR, rate card rate, viewership, CPP, CPM (cost per thousand) and other calculations. The results 1610 that may be calculated from this information using the forecasting module 1608 may also comprise future values of sellout level, AUR, BMR, rate card rate, viewership, CPP, CPM and other calculations. The performance forecasting manager 508 enables network providers to view the forecasted results 1610 to determine if they are on target to meet current targets and budget. This will enable them to make better decisions regarding pricing and overall sales strategies based upon the forecasted results.

The performance forecasting manager 508 may also utilize custom/manual inputs 1608 in order to adjust the output results 1610 from the performance forecasting manager. These custom inputs may comprise information that may not be viewed within the historical data 1602. For example, if there was a great deal of employee attrition within a particular sales office, the amount of sales coming from that office could be affected in a negative fashion. The performance forecasting manager enables customize/manual adjustments to be made to the forecasting model 1608 based upon this knowledge in order to better provide forecasted results 1610 that take all factors into consideration. The performance forecasting manager 508 also enables users to adjust the lever/inputs to the forecasting model 1608 to receive and consider any type of information which conceivably could affect the forecasted results 1610.

The forecasting model 1608 of the performance forecasting manager 508 may also leverage third-party historical data and forecasting information 1612 to identify correlations between advertising parameters such as sellout, AUR, etc. and economic or social media indicators such as gross domestic product, retail sales, etc. The third-party historical and forecasting information 1612 may be economic information, social media information, etc. The correlation sensitivity of the third-party historical and forecasting data 1612 may be determined for things such as how does GDP impact advertising sellout in a market or enterprise label. This correlation sensitivity may be combined with forecast of third-party indicators to enable the performance forecasting manager 508 to adjust their forecast results 1610 appropriately to more accurately reflect future performance based upon these correlation sensitivities. In this manner, more detailed and accurate prediction results 1610 are obtained.

Figure 17:
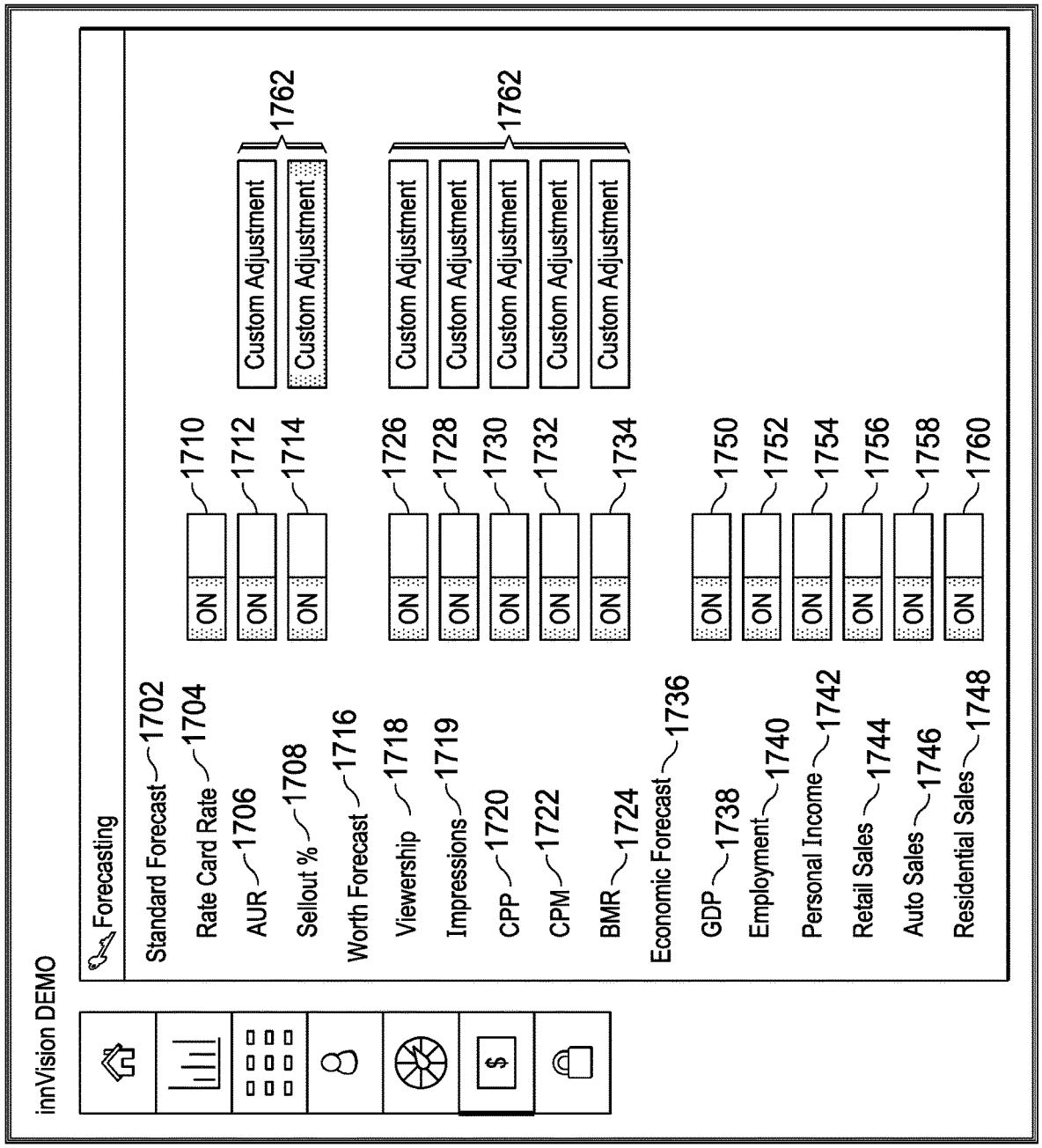
FIG. 17 illustrates a graphical user interface for controlling various forecasting functionalities.

Referring now to FIGS. 17-18 there illustrated various manners for controlling the forecasting reports that may be generated on the graphical user interface using the inventory management system 402. FIG. 17 illustrates the various control parameters that may be established through the graphical user interface for controlling forecasting predictions made by the performance forecasting manager 508. Standard Forecast parameters 1702 which may be turned on or off include the Rate Card Rate 1704, AUR 1706 and Sellout % 1708. Each of these factors are turned on and off for consideration by the performance forecasting manager 508 using an associated toggle button 1710-1714 for each of the respective parameters. The Worth Forecast parameters 1716 which may be included or not included in forecasting predictions include Viewership 1718, Impressions 1719, CPP 1720, CPM 1722 and BMR 1724. Each of the Worth Forecast parameters 1716 are turned ON/OFF using associated toggle buttons 1726-1734. Economic Forecast parameters 1736 that are provided to the performance forecasting manager 508 include GDP 1738, Employment 1740, Personal Income 1742, Retail Sales 1744, Auto Sales 1746 and Residential Sales 1748. The GUI also supports other factors that may by added. Each of these factors may be turned on and off independently for application to the performance forecasting manager 508 using associated toggle buttons 1750-1760.

The Standard forecast parameters 1702 and Worth forecast parameters 1716 may also be independently customize by the user by clicking on an associated custom adjustment button 1762. The custom adjustment button 1760 enables the users to input particular desired adjustments to the associated parameters rather than implementing them in their normal format is more fully described in FIG. 18. The Economic forecast parameters 1786 do not have associated custom adjustment capabilities. FIG. 18 illustrates the various custom forecast adjustments that may be made to the Standard forecast parameter 1702 for Sellout %. This graphical user interface would be pulled up responsive to a user clicking on the custom adjustment button 1762 associated with Sellout % 1708. The create adjustment section 1800 include general criteria which may be established for application to all types of parameters that are processed using the performance forecasting manager 508. The fields available for adjustments within the create adjustment section 1800 include a division field 1802 for selecting the divisions for consideration in the forecast by the performance forecasting manager 508, a region field 1804 for controlling the regions included in a performance analysis, a market field 1806 for controlling the markets included in a performance analysis, a zone field 1808 for controlling the zones included in a performance analysis, a network field 1810 for selecting the networks included in a performance analysis and a daypart field 1812 for selecting dayparts to be included in a performance analysis by the performance forecasting manager 508. Date criteria may be established using a period field 1814 that enables selection of weekly, monthly, quarterly, and yearly time periods for the performance analysis. Additionally, a date range field 1816 may be used for establishing a date range in which an analysis is to be performed.

A custom adjustment section 1818 of the custom forecast adjustment page enables adjustments to be applied to particular parameters for the performance forecasting manager 508. Actions 1820 may be edited through an edit button 1822 or deleted using a delete button 1824. Divisions 1826 may be established within associated division field 1828. In a similar manner, particular Regions 1830, Markets 1834, Zones 1838, Networks 1842 and Daypart 1846 may be selectively adjusted using associated fields 1832, 1836, 1840, 1844 and 1848, respectively. Thus, for example, as shown at field 1844 a particular customized adjustment is made to only the AMC network. Monthly columns 1850 illustrates particular adjustments up or down within adjustment fields 852. Thus, as can be seen within the example of FIG. 18, within the first row performance is dropped by 50% for Division 1, Region 1, Market 1 in all zones, all networks and all dayparts in the month of October. In the second row, Performance is lowered by 1% in August, raised by 10% in October and raised by 2% in November for Division 1, Region 1, Market 1, Zone 1003, for AMC Network during Prime Time. Finally, performance calculations remained unchanged for August through December for Division 2, Region 3, Market 23, Zone 1149, for Comedy Network during Prime Time. Thus, as can be seen, unique performance adjustments may be made based upon factors that are uniquely applied to particular areas or groups. The adjustment screens would be similar for each of the other Standard Forecast parameters 1702 and Worth Forecast parameters 1716.

Figure 19:
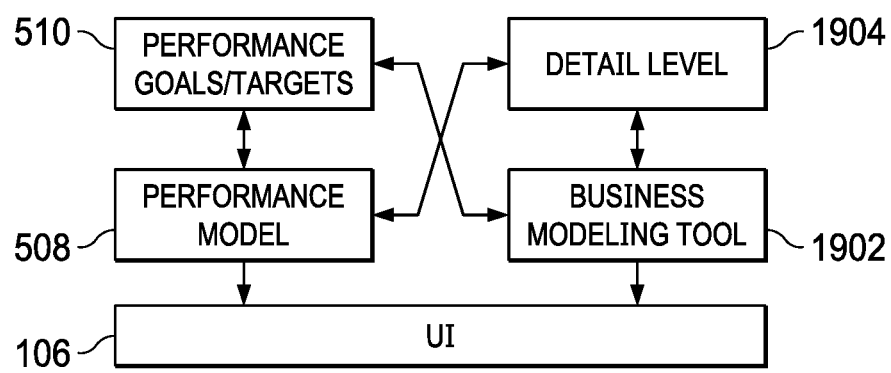
FIG. 19 illustrates operation of the performance goals/targets manager in conjunction with a performance model manager and business model tool.

Referring now to FIG. 19, there is illustrated the operation of the performance goals/targets manager 510 in conjunction with the performance model manager 508 and business modeling tool 1902. The inventory management system 402 allows advertising operators to input performance goals/targets through the performance goals/targets manager 510 using a user interface 106. The performance goals/targets manager 510 provides a single source to capture these goals across a variety of detail levels 1904. The detail levels 1904 enable capturing of goals across all markets, zones, networks, dayparts and timeparts and enables these goals to be rolled up to an enterprise level or any custom level such as division, region territory, etc. The performance goals/targets manager 510 assist pricing and sales teams of cable operators since these teams typically have performance (dollar) goals to strive for on a monthly/quarterly/yearly basis.

The performance goals/targets manager 1510 enables a user to set dollar goals down to the zone/network/daypart/timepart level by month, while still being able to see the rollup of all goals to the zone/markets/region/division level. The generation of the rollups of the goals may be achieved using the previously discussed performance model 508. The user interface 106 enables for quick and easy adjustment of monthly goals in order to view how the changes in goals impact the overall monthly goals at the zone level.

The performance goals/targets manager 510 uses the performance goals within the business modeling tool 1902 to enable users to see their actual performance compared to the goals that they entered through the user interface 106. The side-by-side comparison provides a picture of how close or far away sales are from their goals. This real-time view of actual performance provided by the performance model 508 compared to goals at a summary (enterprise) or granular (daypart with a zone for a specific network) level provided by the performance goals/targets manager 510 working in conjunction with the business modeling tool 1902 allows advertising operators to quickly make course correcting decisions and accurately report on projected performance.

Referring now to FIGS. 20A-20B, there is illustrated the user interface for entering performance goals in to the performance goals/targets manager 510. If there is an overall goal (ie: at the market level) and adjustments are made to a more granular level, the system will ensure all of the piece parts still roll up to the bigger goal at higher levels. For example, if a goal for one Zone (under a market goal) is entered, the system will put the reset of the market goal under "All Other Zones." The date field 2002 enables a user to establish a date period for which goals are to be established. In the present example, a time period from Dec. 26, 2016 through Dec. 31, 2017 is established. Multiple columns may be selected depending upon the level of granularity that particular goals are to be applied. The zone column 2004 enables establishment of goals at the zone level. The network column 2006 enables establishment of goals at the network level. The daypart column 2008 enables the establishment of goals at the daypart level, and the timepart column 2010 enables the establishment of goals at the timepart level.

The previous performance column 2012 contains information regarding the previous performance at the level of granularity established by the indicated column. Thus, for Zone AAAA there were previous sales of $55,731,600. For the AEN network in Zone AAAA there were previous sales of $1,371,600. For the Prime Time period, there were sales of 548,600 and during the 8 PM to 9 PM timepart there were sales of 164,592. The current goals column 2014 enables the user to establish the desired goals with respect to the various zones, networks, dayparts and timeparts. The goals may be further broken down by month within the monthly columns 2016. The desired goals are entered through the graphical user interface illustrated in FIG. 20. New zones and all the associated information may be accomplished using the add zone button 2018.

Figure 21A:
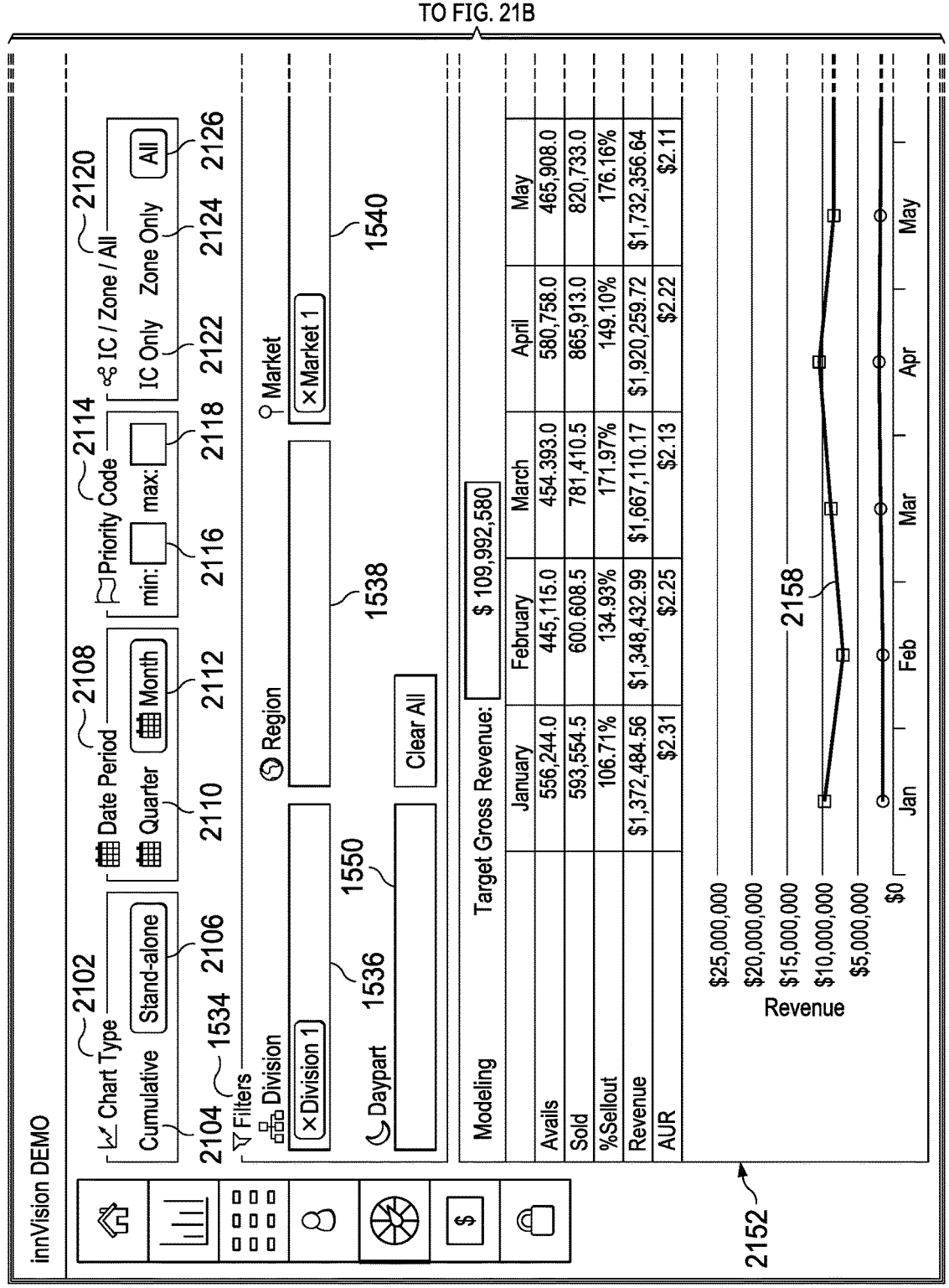
FIGS. 21A-21B illustrates a comparison of actual revenue to target revenue.
Figure 21B:
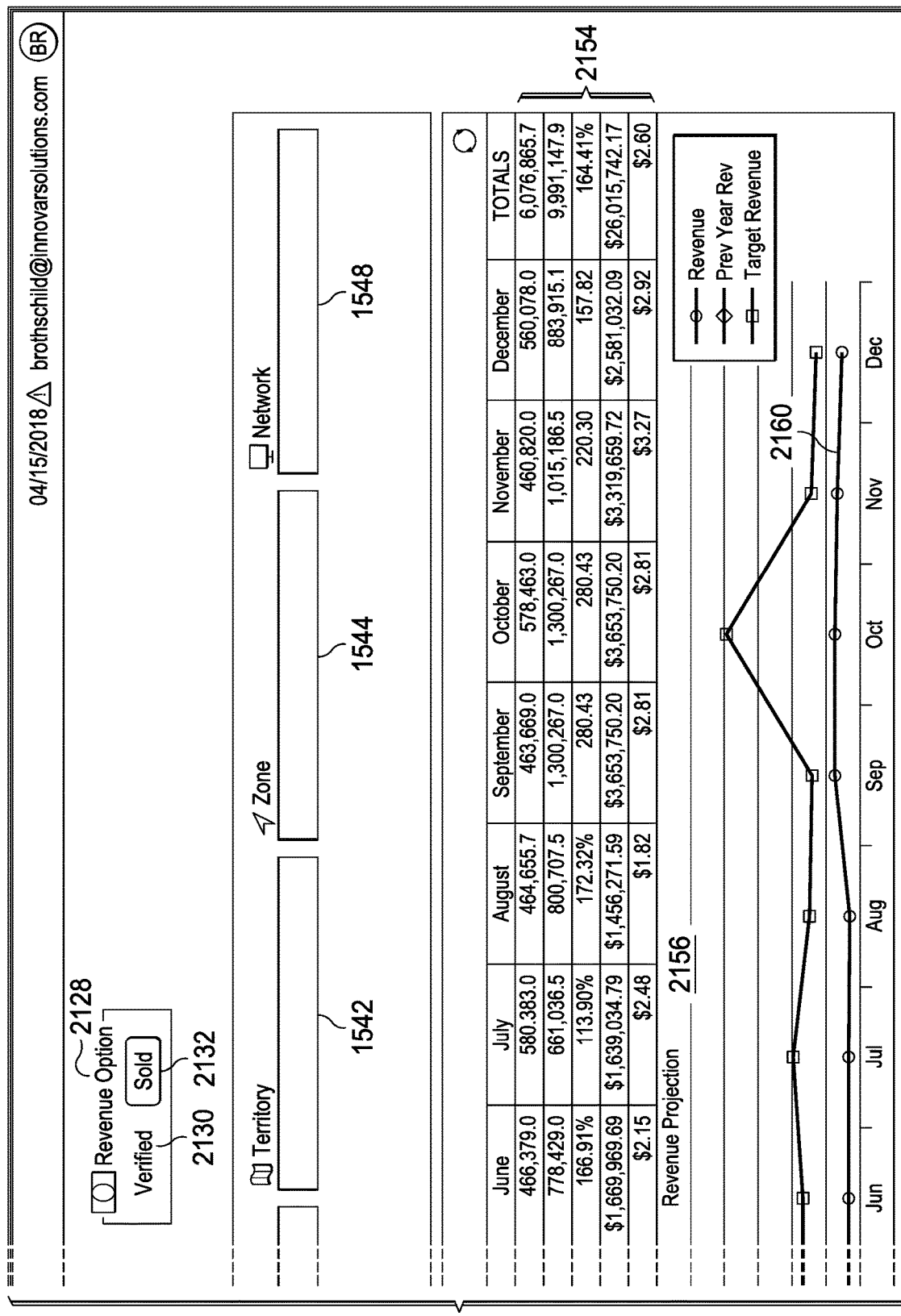

FIGS. 21A-21B illustrates one manner in which the performance goals illustrated within the performance goals/targets manager 510 through the graphical user interface illustrated in FIG. 20 may be used to compare actual revenue to target revenue. The business modeling tool 1902 utilizes the goals input through the performance goals/targets manager 510 for generation of the graphical user interface illustrated in FIGS. 21A-21B. The chart type section 2102 enables selection of a cumulative chart via cumulative button 2104 or a standalone chart using standalone button 2106. The date period section 2108 may be displayed in a quarterly format via quarterly button 2110, or in a monthly format via month button 2112. The priority code section 2114 may be used to show revenue associated with particular priority codes using a priority code minimum field 2116 and priority code maximum field 2118. Within the IC/zone/all section 2120, the user can toggle between showing revenue associated only with interconnect inventory using the IC only button 2122, zone level inventory revenue using the zone only button 2124, or all inventory revenue using the all button 2126. The revenue option section enables a user to toggle between showing verified or sold inventory. Button 2130 is used to show verified inventory and button 2132 is used show sold inventory. A filter section 1534 includes filter boxes for filtering the data according to division 1536, region 1538, market 1540, territory 1542, zone 1544, network 1548 and daypart 1550.

The modeling section 2152 displays the target gross revenue in field 2154 responsive to the selections made in the above described areas. This is an editable field. Rows 2154 illustrate the Available inventory, Sold inventory, % Sellout, Revenue and AUR with the model time period. The % Sellout and AUR are editable fields in future month time periods that allow a user to run through "what if" scenarios. The revenue projection chart 2156 displays the target revenue 2158 with respect to the actual revenue 2160 for visual comparison purposes.

Figure 22:
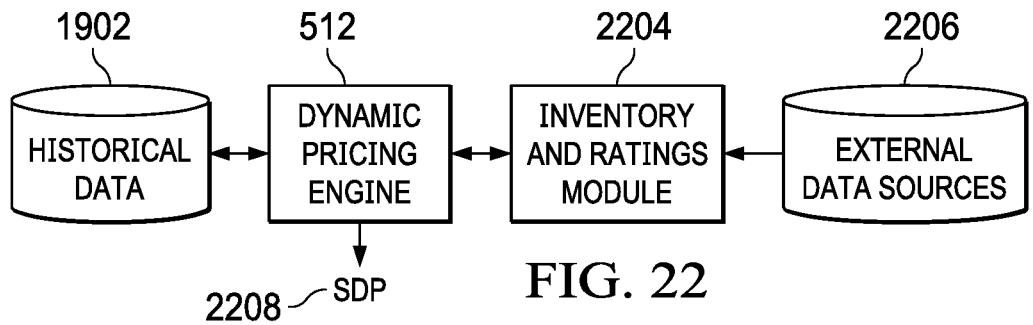
FIG. 22 illustrates a dynamic pricing engine of the inventory management system.

Referring now to FIG. 22 there is more particularly illustrated the dynamic pricing engine 512 of the inventory management system 402. The dynamic pricing engine 512 dynamically prices advertising inventory by leveraging historical and forecasted information 2202. The dynamic pricing engine 512 interacts with an inventory and ratings module 2204 which accesses external data sources 2206 to calculate the value of advertising inventory. The external data sources 2206 may include for example Nielsen ratings, SQAD data and UE data. The DPE 512 builds upon the data provided from the inventory and ratings module 2204 and historical data 2202 to enhance forecasting and predictive pricing capabilities. The historical data 2202 and data provided from the inventory and ratings manager 2204 leverages various data parameters to derive a suggested dynamic price (SDP) 2208 for the advertising operators' inventory item. The data parameters include sellout, AUR, rate card, viewership, CPP, CPM, calculated worth/BMR, and forecasted values for each of the preceding parameters, third-party information and custom adjustments provided by the users. The dynamic pricing engine 512 ability to dynamically price advertising inventory provides the advertising operator with the ability to optimize their pricing and improve inventory utilization while maximizing revenue potential.

Figure 23:
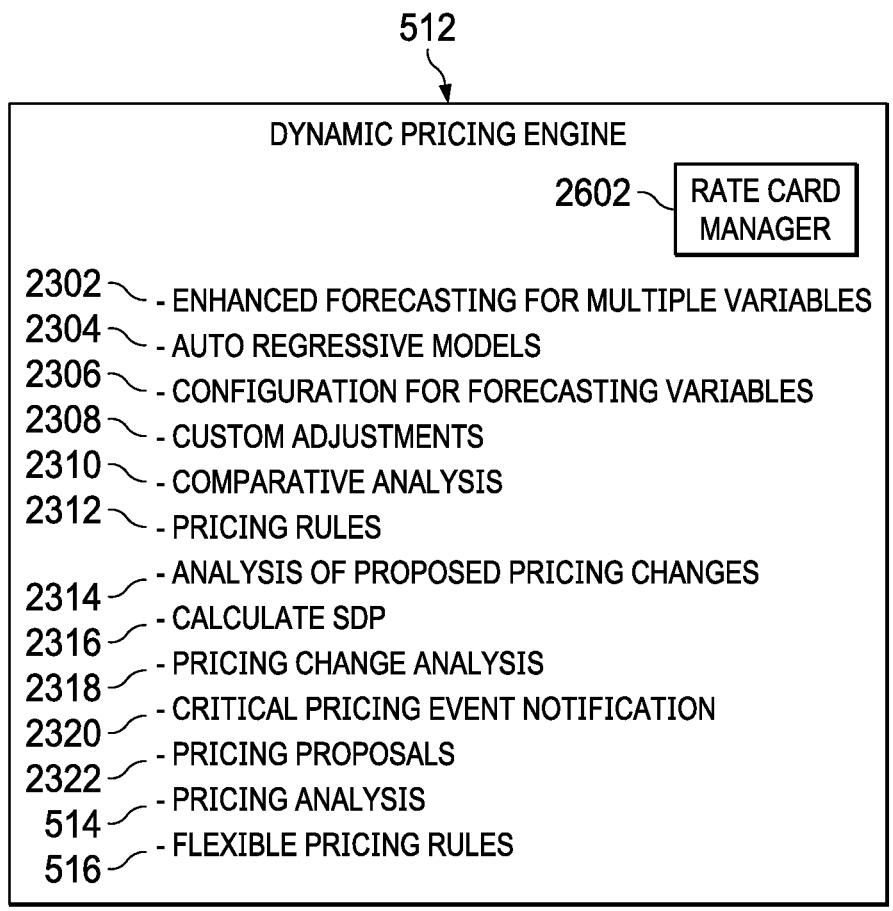
FIG. 23 illustrates various functionalities of the dynamic pricing engine manager.

Referring now to FIG. 23, there is more particularly illustrated the functionalities of the dynamic pricing engine manager 512. The DPE manager 512 enhances the inventory management systems 402 forecasting capabilities and provides configuration and custom adjustment across multiple levels. The DPE 512 provides enhanced forecasting of prices for multiple variables 2302. Thus, the determination of the SDP 2208 may be based upon multiple variables that may affect pricing. The forecasting of prices by the DPE 512 may also be based upon autoregressive models 5304. An autoregressive model 5304 is a representation of a type of random process. The autoregressive model 5304 specifies that an output variable depends linearly on its previous values and on a stochastic term. Thus a regressive model is a form of stochastic difference equation. The DPE 512 enables configuration for forecasting variables 2306 to be made by the user such that the predictions may be based upon forecasting variables established in a desired configuration. The DPE includes custom adjustment functionalities 2308. These custom adjustment functionalities 2308 may include the ability to create custom adjustments to accounts based upon known business changes. Thus, if certain factors have occurred within a business that would affect the ability to price inventory, these business factors could be taken into account with respect to the generation of price by the DPE 512. The DPE 512 may also perform comparative analysis for economic indicators 2310. Thus, current economic indicators could be compared to previous economic indicators for the determination of price by the DPE 512.

The DPE 512 comprises a powerful pricing engine that leverages a set of custom pricing rules 2312 that may be used for establishing the SDP 2208. The pricing rules 2312 enable both the configuration and customization of pricing rules with respect to the SDP 2208. The DPE 512 also includes the ability to analyze proposed pricing changes 2314 to enable users to better determine the effects and benefits of a proposed pricing change. The analysis of proposed pricing changes 2314 provides a clear pricing analysis to measure the impact of the proposed pricing changes. As described previously, the dynamic pricing engine 512 also provides the ability to calculate the suggested dynamic price based on historical and forecasted variables 2316. Analysis of pricing changes 2318 enables a user to analyze a proposed pricing change and determine whether or not to implement a proposed change. The DPE 512 also includes critical pricing event notifications 2320. The critical pricing event notifications 2320 cause the inventory management system 402 to generate some type of notification to a user that a critical pricing event has occurred to which the user needs to react.

The dynamic pricing engine 512 allows users to create an optimize proposal by providing a varying degree of inputs. Pricing proposals functionalities 2322 enable a user to create a proposal by simply entering basic information such as budget, ratings goals or impression goals, number of spots and demographic targets. The DPE 512 uses this information to create a draft proposal for the user to edit and submit. A user can also enter specific details for all portions of the proposal and the DPE 512 will create a draft proposal for the user to edit and submit. For all proposals the system will provide feedback regarding performance comparison to particular goals such as budgets, ratings, impression, spots and to project a clearance probability.

As will be more fully described hereinbelow, the DPE 512 provides various different types of pricing analysis functionalities 2324 for analyzing pricing proposals. Additionally, flexible pricing rules 2326 may be established by the DPE for controlling pricing of inventory with respect to changing environmental conditions.

Figures 24, 27, 30:
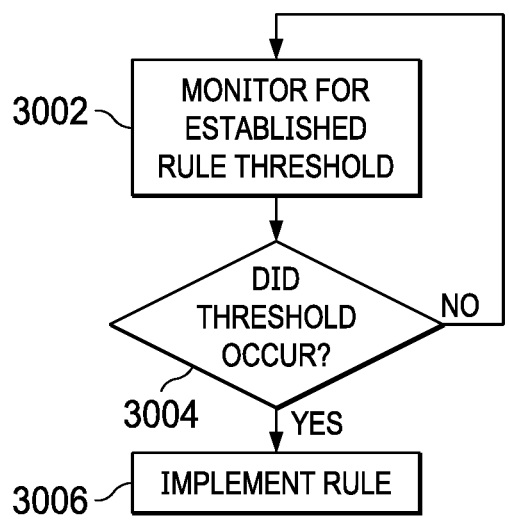
FIG. 24 illustrates a rate card manager.
FIG. 27 illustrates pricing analysis functionalities of the dynamic pricing engine.
FIG. 30 illustrates a flow diagram of flexible pricing rules implemented within an inventory management system.

Referring now also to FIG. 24, the dynamic pricing engine 512 includes a robust and flexible rate card manager 2402 that enables detailed rate analysis and easy tracking of all changes with respect to rate cards. The rate card manager 2402 enables a user to create and manage weekly, monthly and quarterly rate cards 2404 with respect to the available advertising inventory. The rate card manager 2402 may also provide flexible approval of workflow 2406. The Rate Card Manager approval process allows for all approvals to be handled electronically. Currently, Pricing Managers are submitting their suggested changes to their Sales Managers via XLS/Email or reviewing them in person. Having all submissions/approvals in the dynamic pricing engine 512 allows for approval tracking and cuts down on timelines. The rate card manager 2402 in conjunction with the DPE 512 provides SDP and critical notifications 2408 with respect to prices related to inventory. Thus, determinations of the SDP and notification of issues associated with the dynamic price may be accomplished. The rate card manager 2402 may also be integrated with other Order Management Software (ie: Strata's RCM) to provide for automated updates 2410 with respect to the rate card values. This enables any changes in rate card data to be quickly implemented within the system. The rate card manager 2402 may also analyze historical performance with respect to rate card information and forecast future rate card rates based upon this historical information 2412.

Figure 25A:
Figure 25B:
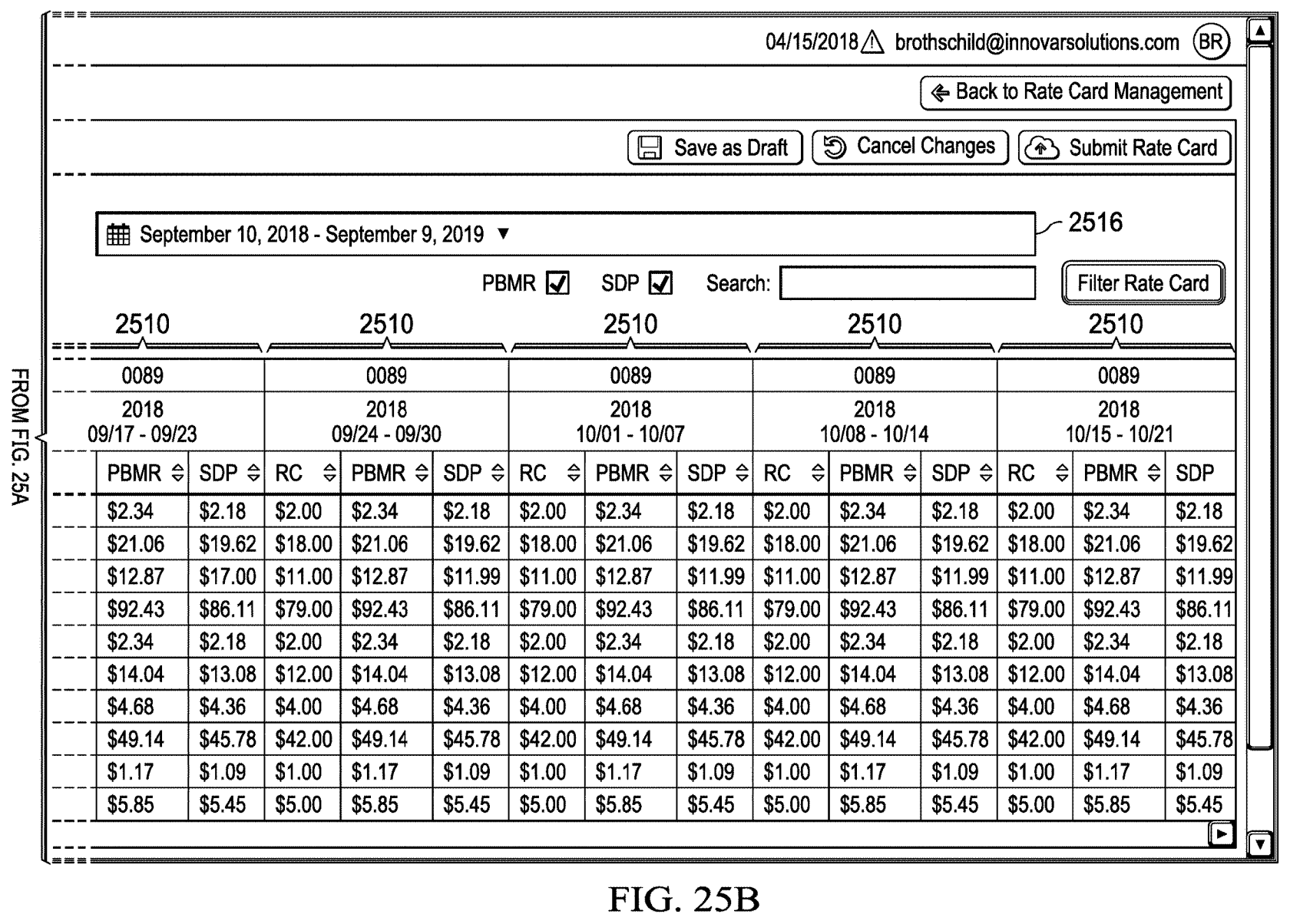

Referring now to FIGS. 25A-25B, there is illustrated the graphical user interface generated with respect to the rate card manager 2402. The rate card interface 2502 includes a network column 2504 for illustrating the network associated with the rate card information. A daypart description column 2506 identifies the title given to the daypart that information is being displayed with respect thereto. The daypart column 2508 provides a specific description of the daypart by day of the week and time of day. Next are multiple repeating date range columns 2510. The date range columns 2510 represent a week but differing repeating periods may be selected. Each of the date range columns 2510 includes an RC (rate card value) column 2612, a PBMR (Projected Bench Mark Rate) 2614 and an SDP (suggested dynamic price) column 2616. This enables each of these prices to be viewed in a side-by-side configuration enabling easy analysis. A date field 2516 enables a range of dates to be selected over which the rate card information is to be displayed. A filter rate card field section 2518 enable filtering of the information with respect to zones via field 2520, networks via field 2522 and dayparts via field 2524.

Figure 26A:
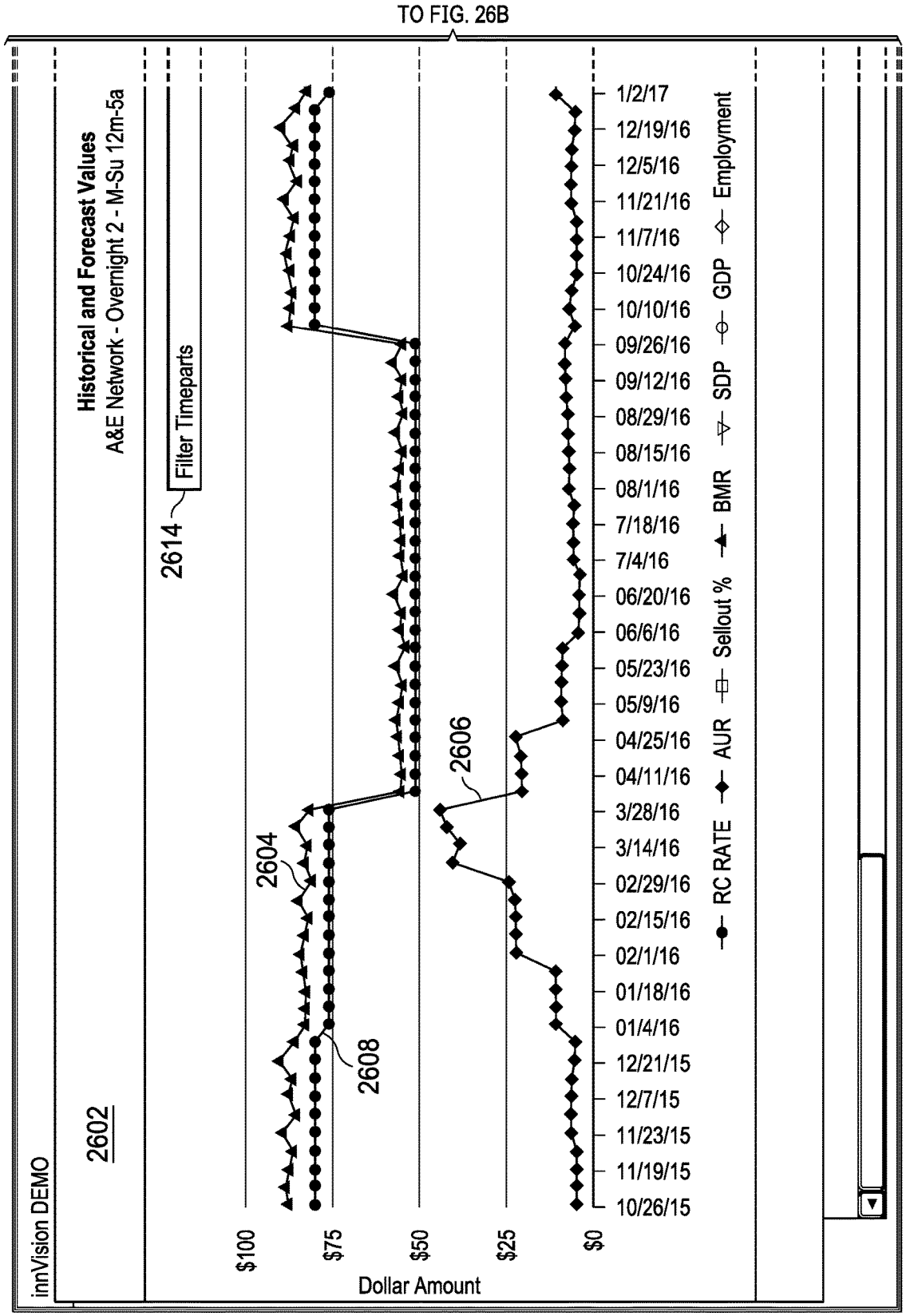
FIGS. 26A-26B illustrates a graphical user interface for providing rate card integer analysis relating to historical and forecast information.
Figure 26B:
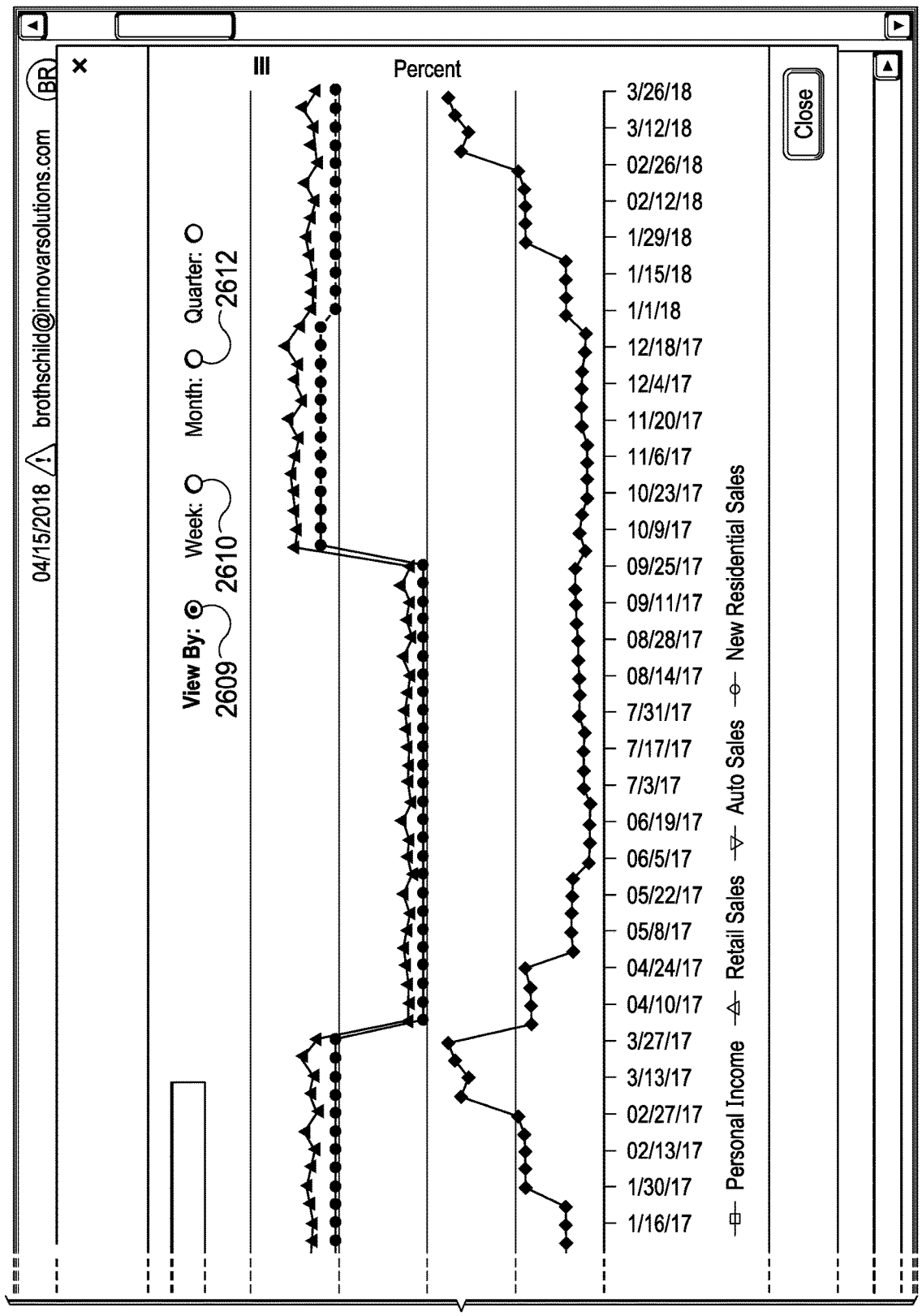

FIGS. 26A-26B provides an illustration of the graphical user interface for providing rate card manager analysis to display historical and forecast information with respect to rate card data. In this particular historical and forecast values chart 2602 data is displayed with respect to the A&E network for an overnight period running Monday-Sunday 12 m-5 am. Line 2604 represents the historical and forecast values for the BMR data. Line 2606 represents the historical and forecast values for the AUR data and line 2608 represents the historical and forecast values for the rate card rate. Buttons 2609-2610 enable data to be displayed by the week, month or quarter, respectively. Various time parts may be filtered using field 2614. The various data that is displayed with respect to a network is indicated by the highlighted indicators running along the bottom edge of the chart and include RC (rate con) rate, ARU, Sellout %, BMR, SDP, GDP, Employment, Personal Income, Retail Sales, Auto Sales and New Residential Sales. The system can also support additional economic factors as needed.

Referring now to FIG. 27 there is illustrated more information regarding the pricing analysis functionalities 2324 that comprise a portion of the dynamic pricing engine 512. The pricing analysis functionalities 2324 may analyze a suggested dynamic price 2208 with respect to a number of differing factors. Thus, the impact of not only the SDP but also the impact of pending rate changes to the bottom line may be analyzed with respect to the price analysis functionalities 2324. This allows advertising operators to understand how proposed pricing changes will impact things such as optimal rate 2702, revenue 2704, AUR 2706, sellout levels 2708, rate card rate 2710 and BMR 2712. The pricing analysis functionalities 2324 allow a user to see the forecasted revenue 2704 of a particular market alongside the worth of that market and compare how the AUR 2706 and revenue 2704 would be impacted should all suggested prices 2208 be accepted. The pricing analysis functionalities 2324 can drill down into pending changes to see how the SDP 2208 compares to the AUR 2706, rate card 2702, BMR 2712 and the model's optimal rate in a chart to have a better visualization of the relationship of all these data points. If any events triggered the SDP 2208, these would also be presented.

Referring now to FIG. 28, there is illustrated the top level pricing analysis function 2324 graphical user interface 2802.

The SDP section 2804 displays the suggested dynamic price for multiple markets 2806. The projected revenue section 2808 illustrates the projected revenue levels 2810 associated with each of the markets based upon the SDP. The AUR section 2812 illustrates the AUR levels 2814. The SDP chart 2816 displays various information with respect to suggested dynamic prices within each row of the chart. Column 2816 indicates the SDP price. Column 2818 designates the rate card name. Column 2820 designates the rate card rate. Column 2822 designates the daypart associated with the suggested price. Column 2824 designates a network associated with the suggested price. Column 2826 designates the zone associated with the suggested price. Column 2828 designates the market associated with the price and column 2830 designates the region associated with the suggested price. Column 2832 provides an activation box 2834 which when checked will activate the suggested dynamic price associated with the entry.

Figure 29:
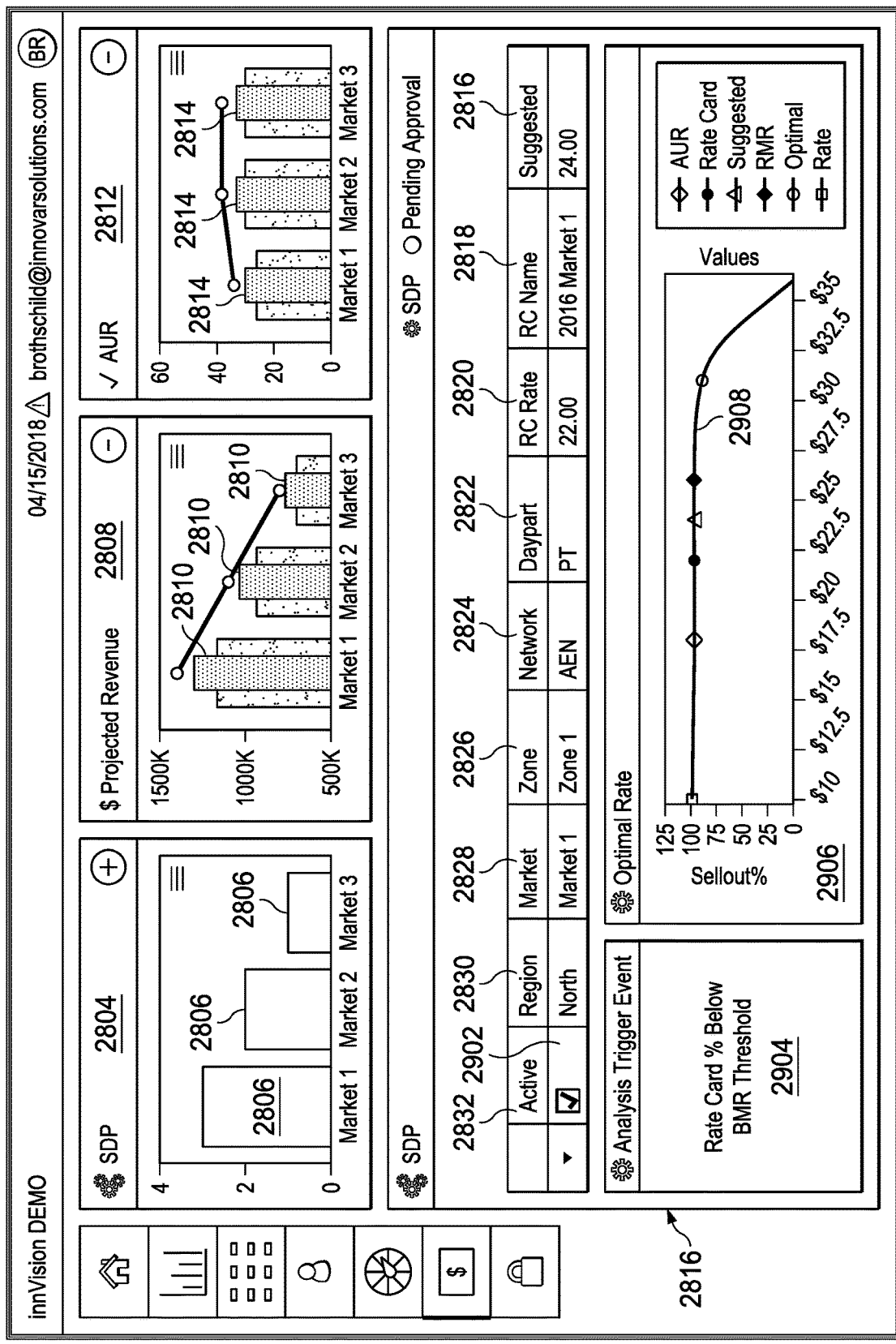
FIG. 29 illustrates a pricing analysis drill down associated with an optimal rate.

FIG. 29 illustrates a pricing analysis drill down associated with optimal rate when box 2902 is clicked on within the active column 2832 of the SDP chart section 2816. This causes display of an analysis trigger event section 2904 indicating that the rate card percent falling below the BMR threshold is an analysis trigger event. The optimal rate section 2906 displays the sellout percentage with respect to SDP using line 2908. Thus, as the SDP increases beyond a particular rate, the sellout percentage begins to drop.

The flexible pricing rules manager 516 associated with the dynamic pricing engine 512 enables advertising operators to develop automated and non-automated (notification only) rules that can be applied to impact the rate card rate. These automated rules allow advertising operators to automate rules versus manually setting rates for a large volume of rate cards. An example of a pricing rules would be to set the rate card rate to 125% of the current rate if sellout levels for a certain inventory area reach 70%. The pricing rules manager 516 allow the user to automate rate card changes or provide them with the ability to quickly review high-value opportunities (rules that notify versus automate) for immediate decision. This will result in significant time savings and allow them to implement rate card changes faster which will result in increased revenue. Thus, the flexible pricing rules could be implemented within the inventory management system 402 as shown generally in FIG. 30. Once the rules are established within the system, the system will monitor at step 3002 for the occurrence of an established rule threshold. This threshold may be related to any of the parameters described herein with respect to inventory sales of cable advertising. Inquiry step 3004 determines if the monitored threshold levels occur. If not, control passes back to step 3002 to continue monitoring for the established threshold. Once inquiry step 3004 determines that a threshold has been reached, the rule associated with a threshold is implemented at step 3006. Implementation of the rule may involve various things such as notifying the user of reaching the threshold so the user can make decisions with respect to the inventory management system 402 or may implement automated rules that change factors within the inventory management system in order to alter system operation and pricing.

Figure 31:
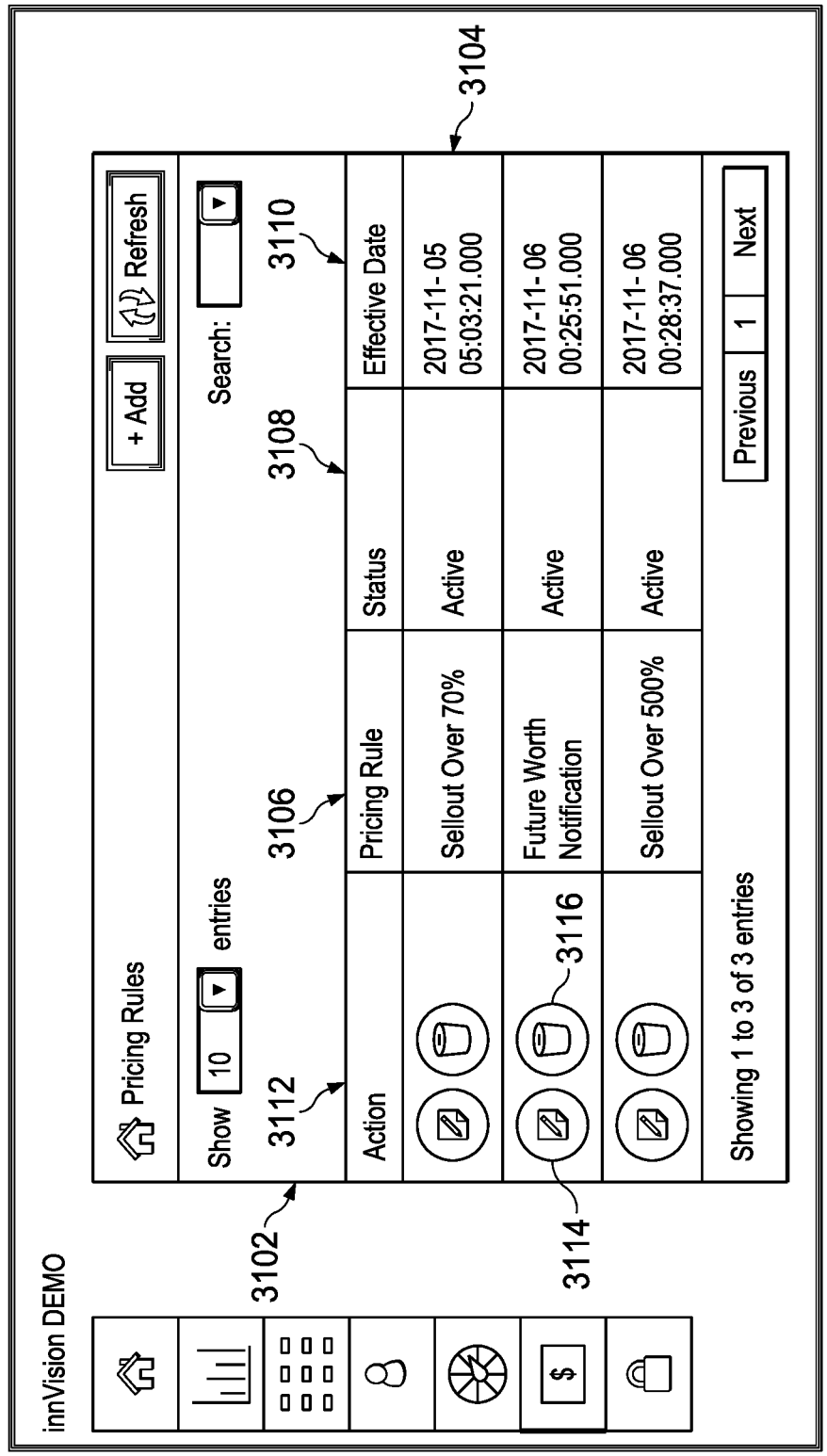
FIG. 31 illustrates a price landing page.

FIG. 31 illustrates a pricing rules landing page 3102 that is displayed responsive to selection of a pricing rules actuator. Each row 3104 of the table is associated with a particular pricing rule. Column 3106 is the pricing rule column that describes the rule within the system. The examples in FIG. 31 include Sellout over 70%, Future Worth Notification and Sellout over 500%. Column 3108 indicates the status of the rule and whether it is active or inactive. Column 3110 denotes the effective date of the pricing rule. Column 3112 is the action items column and includes an edit button 3114 which may be actuated to edit the pricing rules and a delete button 3116 which may be used for deleting a pricing rule.

Figure 32:
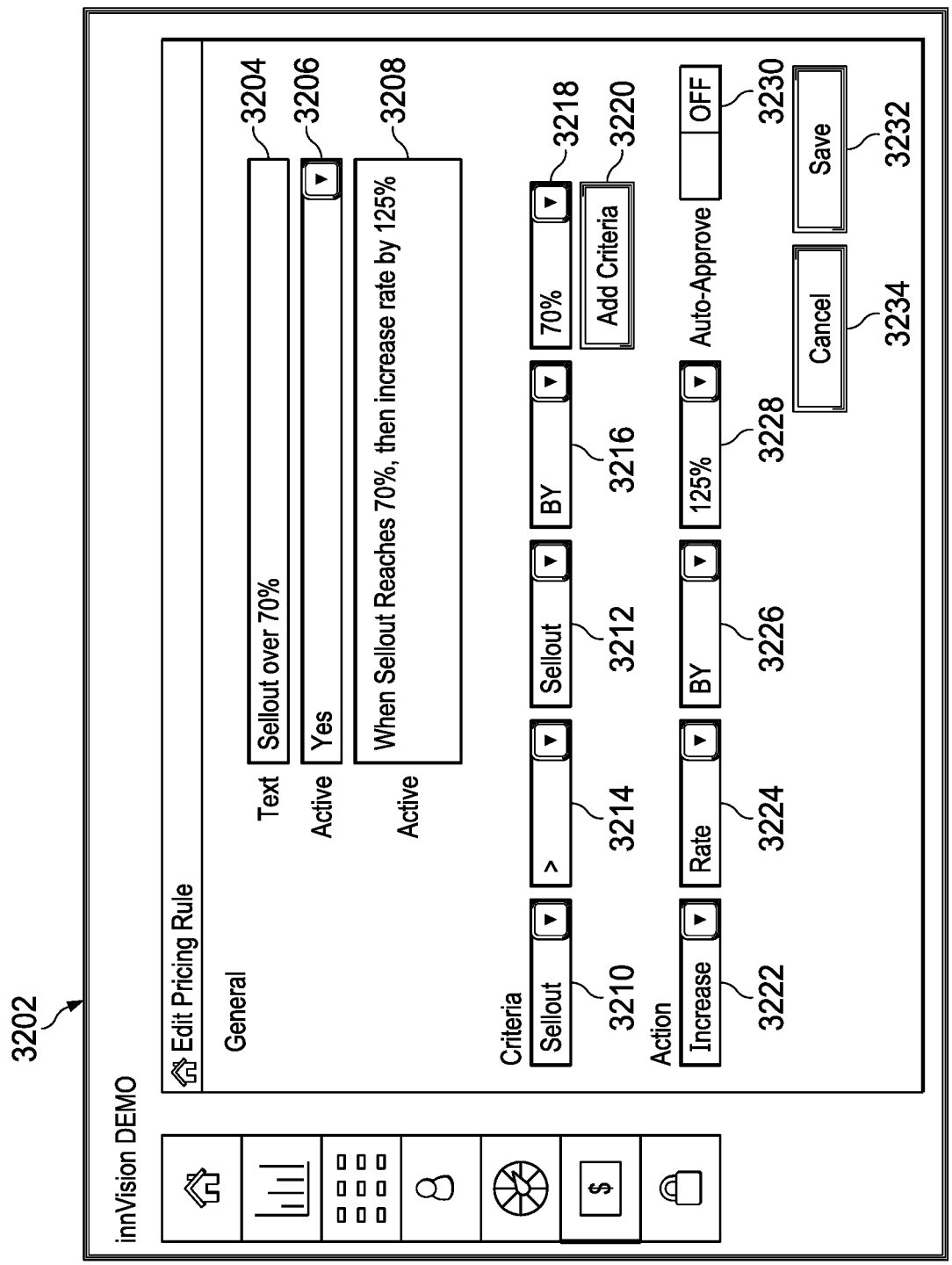
FIG. 32 illustrates an edit pricing rule page of a graphical user interface.

When the edit pricing rule button 3114 is actuated, the edit pricing rule page 3202 is displayed as shown in FIG. 32. The edit pricing rule page 3202 includes a general section including the pricing rule name field 3204, wherein the name of the pricing rule may be established. The active drop-down menu indicates whether the pricing rule is active or inactive 3206 via a yes or no comment. A pricing rule description field 3208 provides general description of the pricing rule. In the example of FIG. 32, the rule establishes that when sellout reaches 70% rates are increased by 125%. The criteria section is used for establishing the criteria (threshold) of the pricing rule. Drop-down menu 3210 and 3212 are used for selecting the particular variables associated with the rule. The drop-down menus 3210, 3212 may include variables such as Sellout, PSellout, AUR, PMB Are, Rate, etc. for selection Drop-down menu 3214 may be used to designate mathematical relationships such as greater than (>), less than (<) or equal to (=). Drop-down menu 3216 may be used to input relationship variables such as and, or, ect. Percentage field 3218 is used for entering percentage values as part of the rule. Additional criteria associated with the rule maybe entered by clicking on the add criteria button 3220.

The actions section includes an action item drop-down menu 3222 enabling selection of various actions to occur responsive to reaching the criteria thresholds established above. These include a choice of, decrease, set, notify and other actions which may be necessary for changing system operation. Drop-down menu 3224 includes parameters to be operated on such as Sellout, PSellout, AUR, PMB Are, Rate, Etc. Field 3226 may be used to input relationship variables such as by, to, ect. Percentage field 3228 may be used for entering percentage values as part of the rule. An auto approve button 3230 is used for turning on and off auto approval of the pricing rule when the established threshold values are achieved. When the auto approve button 3230 is turned on, rules are automatically initiated. When the auto approve button is turned off, the user is notified of reaching of the thresholds. Thus, the above fields have been set to establish a rule having the criteria when sellout is greater than sellout by 70% increase rate by 125%. Rules may then be saved by clicking on a safe button 3232 or canceled using a cancel button 3234.

Using the above described inventory management system 402 cable service operators may obtain a greater level of information with respect to the advertising inventory and have greater abilities for controlling and selling this inventory to potential customers.

It will be appreciated by those skilled in the art having the benefit of this disclosure that this system and method for advertising inventory management for a cable television operator provides an improved method for controlling and managing their advertising inventory. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for managing television network advertising inventory, comprising:
   receiving from a plurality of remote data sources advertising inventory data with respect to advertising inventory parameters for the television network advertising inventory at an inventory management system configured on a central processing server;
   establishing first metric values for a plurality of performance metrics relating to a plurality of performance parameters for the television network advertising inventory using a graphical user interface generated by the inventory management system;
   combining the advertising inventory data for the television network advertising inventory from the plurality of remote data sources to generate a combined database of the plurality of performance parameters for the television network advertising inventory;
   generating a plurality of level of detail views of the combined database of the plurality of performance parameters for the television network advertising inventory responsive to the established first metric values for the plurality of performance metrics, the plurality of level of detail views ranging from an enterprise level view down to a selected lowest level of detail;
   displaying a first level of detail of the combined data of the plurality of performance parameters for the television network advertising inventory on the graphical user interface generated by the inventory management system, the first level of detail responsive to a first established group of the first metric values for the plurality of performance metrics for the television network advertising inventory;
   displaying a second level of detail of the combined data of the plurality of performance parameters for the television network advertising inventory on the graphical user interface generated by the inventory management system, the second level of detail responsive to a second established group of the first metric values for the plurality of performance metrics for the television network advertising inventory;
   establishing metric values for a plurality of inventory metrics relating to a plurality of inventory parameters for the television network advertising inventory using the graphical user interface generated by the inventory management system;
   combining the advertising inventory data from the plurality of remote data sources to generate a second combined database of the plurality of inventory parameters for the television network advertising inventory;
   generating, by the inventory management system, a first inventory map from the second combined database of the plurality of inventory parameters for the television network advertising inventory responsive to a first established group of metric values for the plurality of inventory metrics for the television network advertising inventory;
   displaying the first inventory map from the second combined database of the plurality of inventory parameters for the television network advertising inventory on the graphical user interface generated by the inventory management system;
   generating, by the inventory management system, a second inventory map from the second combined database of the plurality of inventory parameters for the television network advertising inventory responsive to a second established group of metric values for the plurality of inventory metrics; and
   displaying the second inventory map of the second combined database from the plurality of inventory parameters for the television network advertising inventory on the graphical user interface generated by the inventory management system.

2. The method of claim 1, wherein the plurality of performance parameters for the television network advertising inventory comprise at least two of revenue from sales of advertising inventory, average unit rate of advertising inventory, sellout percentage of advertising inventory and available inventory.

3. The method of claim 1, wherein the plurality of performance metrics for the television network advertising inventory comprise at least two of time period, hierarchy level, network group, partners, client, revenue category, advertising inventory type, priority code, zone type and type of revenue.

4. The method of claim 1, wherein the steps of displaying further comprise:
   receiving a user input via the graphical user interface indicating display of the first and the second level of detail in a table format or a chart format;
   displaying the first and the second level of detail in the table format responsive to the user input indicating the table format; and
   displaying the first and the second level of detail in the table format responsive to the user input indicating the table format.

5. The method of claim 1, wherein the plurality of inventory metrics for the television network advertising inventory comprise at least two of week, multi-week, division, region, market, territory, zone, network, priority code, AUR type, weighted, IC/Zone/All, revenue option, zero dollar, sold, daypart, display and layout.

6. The method of claim 1, wherein the steps of generating the first and the second inventory maps further comprises:
   determining a sold percentage of advertising inventory within the second combined database; and
   coloring inventory items within the first and the second inventory maps responsive to the sold percentage of advertising inventory with respect to a particular inventory item.

7. The method of claim 1 further including:
   receiving from the plurality of remote data sources advertising inventory data for the television network advertising inventory at an inventory management system configured on the central processing server;
   establishing first metric values for a plurality of client metrics relating to a plurality of client parameters using the graphical user interface generated by the inventory management system;
   combining the advertising inventory data for the television network advertising inventory from the plurality of remote data sources to generate a combined database of the plurality of client parameters;
   generating a first client detail report from the combined database of the plurality of client parameters responsive to a first group of the established first metric values for the plurality of client metrics, the first client detail report detailing historical detail with respect to the client parameters;

displaying the first client detail report on the graphical user interface generated by the inventory management system;

generating a second client detail report from the combined database of the plurality of client parameters responsive to a second group of the established first metric values for the plurality of client metrics, the second client detail report detailing historical detail with respect to the client parameters; and displaying the second client detail report on the graphical user interface generated by the inventory management system.

8. The method of claim 1 further including:

aggregating historical performance data from the plurality of remote data sources for inventory parameters for the television network advertising inventory using a performance forecasting manager within the inventory management system;

receiving custom inputs for configuring an operation of a forecasting model implemented within the performance forecasting manager through the graphical user interface; and forecasting future performance data for the inventory parameters for the television network advertising inventory responsive to the aggregated historical performance data using the forecasting model configured according the custom inputs.

9. The method of claim 8, wherein the custom inputs comprise at least one of knowledge of industry changes, environmental changes and resource changes.

10. The method of claim 1 further including:

establishing user designated goals for inventory and performance parameters for the television network advertising inventory using the graphical user interface using a goals and targets manager;

obtaining data with respect to the inventory and performance parameters for the television network advertising inventory from the plurality of remote data sources; and generating a display on the graphical user interface of a comparison of the user designated goals for the inventory and the performance parameters for the television network advertising inventory and actual values of the inventory and performance parameters using the goals and targets manager.

11. The method of claim 1 further including:

receiving historical data with respect to the advertising inventory parameters for the television network advertising inventory at a dynamic pricing engine;

receiving forecasted data with respect to the advertising inventory parameters for the television network advertising inventory at the dynamic pricing engine;

generating a suggested dynamic price for advertising inventory responsive to the historical data for the advertising inventory parameters for the television network advertising inventory and the forecasted data for the advertising inventory parameters for the television network advertising inventory using the dynamic pricing engine; and controlling pricing of the advertising inventory responsive to the suggested dynamic price.

12. The method of claim 11 further comprising:

determining an effect of implementation of the suggested dynamic price on the plurality of performance parameters for the television network advertising inventory; and generating a display for the graphical user interface to present the effect of the implementation of the suggested dynamic price on the plurality of performance parameters for the television network advertising inventory.

13. The method of claim 11, wherein the step of generating the suggested dynamic price further includes:

establishing a pricing rule for generating the suggested dynamic price, the pricing rule including an action threshold of an inventory parameter for the television network advertising inventory for implementing an action to set the suggested dynamic price;

detecting occurrence of the action threshold for the inventory parameter for the television network advertising inventory; and implementing the action to set the suggested dynamic price according to the establish pricing rule.

14. The method of claim 13 further including:

notifying a user of the detected occurrence of the action threshold for the inventory parameter for the television network advertising inventory;

receiving a user indication to actuate or not actuate the action to set the suggested dynamic price; and implementing the action to set the suggested dynamic price responsive to receipt of the user indication to actuate the action.

15. A system for managing television network advertising inventory, comprising:

a network interface for connecting to a plurality of remote data sources;

a processor coupled to the network interface for implementing an inventory management system responsive to a stored set of instructions;

a memory coupled to the processor, the memory having data and the stored set of instructions for implementing the inventory management system, the data including advertising inventory data, the stored set of instructions configuring the processor to:

receive from a plurality of remote data sources advertising inventory data with respect to advertising inventory parameters for the television network advertising inventory at an inventory management system configured on a central processing server;

establish first metric values for a plurality of performance metrics relating to a plurality of performance parameters for the television network advertising inventory using a graphical user interface generated by the inventory management system;

combine the advertising inventory data for the television network advertising inventory from the plurality of remote data sources to generate a combined database of the plurality of performance parameters for the television network advertising inventory;

generate a plurality of level of detail views of the combined database of the plurality of performance parameters for the television network advertising inventory responsive to the established first metric values for the plurality of performance metrics, the plurality of level of detail views ranging from an enterprise level view down to a selected lowest level of detail;

display a first level of detail of the combined data of the plurality of performance parameters for the television network advertising inventory on the graphical user interface generated by the inventory management system, the first level of detail responsive to a first established group of the first metric values for the plurality of performance metrics for the television network advertising inventory;

display a second level of detail of the combined data of the plurality of performance parameters for the television network advertising inventory on the graphical user interface generated by the inventory management system, the second level of detail responsive to a second established group of the first metric values for the plurality of performance metrics for the television network advertising inventory;

establish metric values for a plurality of inventory metrics relating to a plurality of inventory parameters for the television network advertising inventory using the graphical user interface generated by the inventory management system;

combine the advertising inventory data from the plurality of remote data sources to generate a second combined database of the plurality of inventory parameters for the television network advertising inventory;

generate a first inventory map of the second combined database of the plurality of inventory parameters for the television network advertising inventory responsive to a first established group of metric values for the plurality of inventory metrics;

display the first inventory map from the second combined database of the plurality of inventory parameters for the television network advertising inventory on the graphical user interface generated by the inventory management system;

generate a second inventory map from the second combined database of the plurality of inventory parameters for the television network advertising inventory responsive to a second established group of metric values for the plurality of inventory metrics for the television network advertising inventory; and display the second inventory map from the second combined database of the plurality of inventory parameters for the television network advertising inventory on the graphical user interface generated by the inventory management system.

16. The system of claim 15, wherein the plurality of performance parameters for the television network advertising inventory comprise at least two of revenue from sales of advertising inventory, average unit rate of advertising inventor, sellout percentage of advertising inventory and available inventory.

17. The system of claim 15, wherein the plurality of performance metrics for the television network advertising inventory comprise at least two of time period, hierarchy level, network group, partners, client, revenue category, advertising inventory type, priority code, zone type and type of revenue.

18. The system of claim 15, the stored set of instructions further configure the processor to:
receive a user input via the graphical user interface indicating display of the first and the second level of detail in a table format or a chart format;
display the first and the second level of detail in the table format responsive to the user input indicating the table format; and
display the first and the second level of detail in the table format responsive to the user input indicating the table format.

19. The system of claim 15, wherein the plurality of inventory metrics for the television network advertising inventory comprise at least two of week, multi-week, division, region, market, territory, zone, network, priority code, AUR type, weighted, IC/Zone/All, revenue option, zero dollar, sold, daypart, display and layout.

20. The system of claim 15, the stored set of instructions further configure the processor to:
determine sold percentage of advertising inventory within the second combined database; and
color inventory items within the first and the second inventory maps responsive to the sold percentage of advertising inventory with respect to a particular inventory item.

21. The system of claim 15 the stored set of instructions further configure the processor to:
receive from the plurality of remote data sources advertising inventory data for the television network advertising inventory at an inventory management system;
establish first metric values for a plurality of client metrics relating to a plurality of client parameters using the graphical user interface generated by the inventory management system;
combine thee advertising inventory data from the plurality of remote data sources to generate a combined database of the plurality of client parameters;
generate a first client detail report from the combined database of the plurality of client parameters responsive to a first group of the established first metric values for the plurality of client metrics, the first client detail report detailing historical detail with respect to the client parameters;
display the first client detail report on the graphical user interface generated by the inventory management system;
generate a second client detail report from the combined database of the plurality of client parameters responsive to a second group of the established first metric values for the plurality of client metrics, the second client detail report detailing historical detail with respect to the client parameters; and
display the second client detail report on the graphical user interface generated by the inventory management system.

22. The system of claim 15 the stored set of instructions further configure the processor to:
aggregate historical performance data from the plurality of remote data sources for inventory parameters using a performance forecasting manager within the inventory management system;
receive custom inputs for configuring an operation of a forecasting model implemented within the performance forecasting manager through the graphical user interface; and
forecast future performance data for the inventory parameters for the television network advertising inventory responsive to the aggregated historical performance data using the forecasting model configured according the custom inputs.

23. The system of claim 22, wherein the custom inputs comprise at least one of knowledge of industry changes, environmental changes and resource changes.

24. The system of claim 15 further including:
establish user designated goals for inventory and performance parameters for the television network advertising inventory using the graphical user interface using a goals and targets manager;
obtain data with respect to the inventory and performance parameters for the television network advertising inventory from the plurality of remote data sources; and generate a display on the graphical user interface of a comparison of the user designated goals for the inventory and performance parameters for the television network advertising inventory and actual values of the inventory and performance parameters using the goals and targets manager.

25. The system of claim 15 the stored set of instructions further configure the processor to:
receive historical data with respect to the advertising inventory parameters for the television network advertising inventory at a dynamic pricing engine;
receive forecasted data with respect to the advertising inventory parameters for the television network advertising inventory at the dynamic pricing engine;
generate a suggested dynamic price for advertising inventory responsive to the historical data for the advertising inventory parameters for the television network advertising inventory and the forecasted data for the advertising inventory parameters for the television network advertising inventory using the dynamic pricing engine; and
control pricing of the advertising inventory responsive to the suggested dynamic price.

26. The system of claim 25, wherein the stored set of instructions further configure the processor to:
determine an effect of implementation of the suggested dynamic price on the performance parameters; and
generating a display for the graphical user interface to present the effect of the implementation of the suggested dynamic price on the plurality of performance parameters.

27. The system of claim 26, wherein the stored set of instructions further configure the processor to:
establish a pricing rule for generating the suggested dynamic price, the pricing rule including an action threshold of an inventory parameter for the television network advertising inventory for implementing an action to set the suggested dynamic price;
detect occurrence of the action threshold for the inventory parameter for the television network advertising inventory; and
implement the action to set the suggested dynamic price according to the establish pricing rule.

28. The system of claim 27 the stored set of instructions further configure the processor to:
notify a user of the detected occurrence of the action threshold for the inventory parameter for the television network advertising inventory;
receive a user indication to actuate or not actuate the action to set the suggested dynamic price; and
implement the action to set the suggested dynamic price responsive to receipt of the user indication to actuate the action.

* * * * *